United States Patent
Nagashima et al.

(10) Patent No.: US 7,369,239 B2
(45) Date of Patent: May 6, 2008

(54) LIGHT MEASURING APPARATUS AND METHOD FOR MEASURING MONOCHROMATIC LIGHT

(75) Inventors: Yoshiyuki Nagashima, Sakai (JP); Kenji Imura, Toyohashi (JP); Shinji Shimizu, Sakai (JP); Katsutoshi Tsurutani, Osaka (JP)

(73) Assignee: Konica Minolta Sensing, Inc., Osaka (JP)

( * ) Notice: Subject to any disclaimer, the term of this patent is extended or adjusted under 35 U.S.C. 154(b) by 433 days.

(21) Appl. No.: 11/210,380

(22) Filed: Aug. 24, 2005

(65) Prior Publication Data

US 2006/0146326 A1 Jul. 6, 2006

(30) Foreign Application Priority Data

Jan. 5, 2005 (JP) ............................. 2005-000583

(51) Int. Cl.
*G01N 21/25* (2006.01)

(52) U.S. Cl. ...................... 356/405; 356/406; 356/407; 356/425; 250/226

(58) Field of Classification Search ................ 356/402, 356/405–407, 416, 425, 326; 250/226
See application file for complete search history.

(56) References Cited

U.S. PATENT DOCUMENTS

| | | | | |
|---|---|---|---|---|
| 4,278,538 A | * | 7/1981 | Lawrence et al. | ......... 209/580 |
| 5,570,192 A | * | 10/1996 | Terauchi et al. | ............ 356/407 |
| 6,462,819 B1 | * | 10/2002 | Terauchi et al. | ............ 356/406 |
| 6,661,915 B1 | * | 12/2003 | Suga et al. | ................. 382/162 |

FOREIGN PATENT DOCUMENTS

| | | |
|---|---|---|
| JP | 2002-013981 | 1/2002 |
| JP | 2003-087806 | 3/2003 |

OTHER PUBLICATIONS

Notice of Reasons for Rejection for Japanese Patent Application No. 2005-000583 mailed Mar. 6, 2007 with English translation, 7 pages.

* cited by examiner

*Primary Examiner*—Layla G. Lauchman
(74) *Attorney, Agent, or Firm*—Brinks Hofer Gilson & Lione

(57) ABSTRACT

A color luminance meter 1 is provided with a polychrometer 4 as a spectral optical system including a light receiving sensor array 43, a signal processing circuit 5 and an operation control unit 6. The operation control unit 6 carries out calculations to obtain characteristics of a measurement light based on a specified spectral responsivity, using light reception signals and specified weighting coefficients. The spectral responsivities of light receiving sensors constructing the light receiving sensor array 43 are selected such that $B \geq 5$ nm and $A/B$ lies within a range of 1.5 to 4.0 when A, B denote the half power band width of the spectral responsivities and a center wavelength interval of the spectral responsivities. Accordingly, there can be provided a light measuring apparatus capable of maximally suppressing errors to highly precisely measure color luminance values and the like even in a measurement of a light lying in a narrow band such as a monochromatic light.

20 Claims, 20 Drawing Sheets

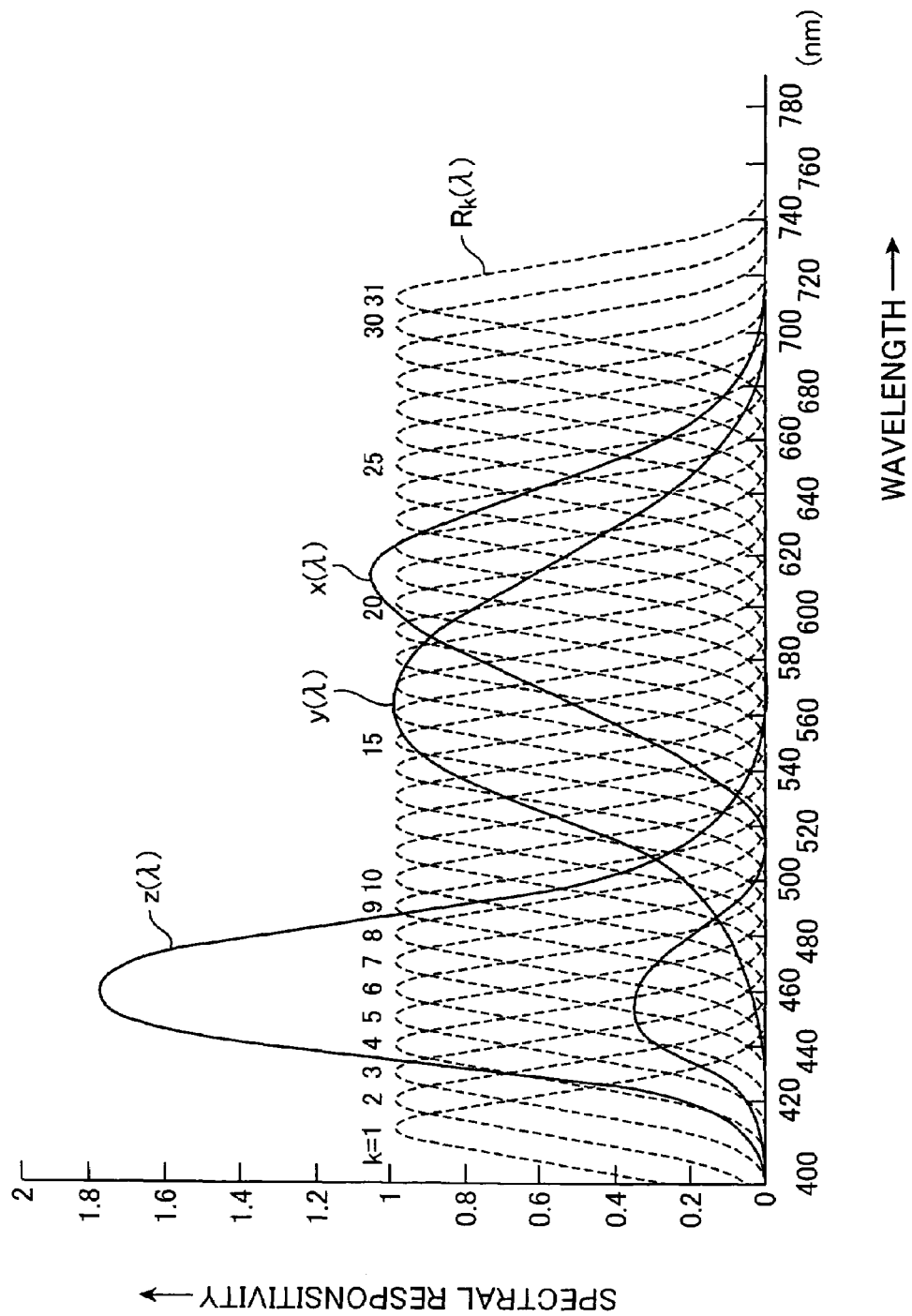

SPECTRAL RESPONSIVITY BEFORE WEIGHTING

SPECTRAL RESPONSIVITY AFTER WEIGHTING

COMPOSITE SPECTRAL RESPONSIVITY

FIG. 9A
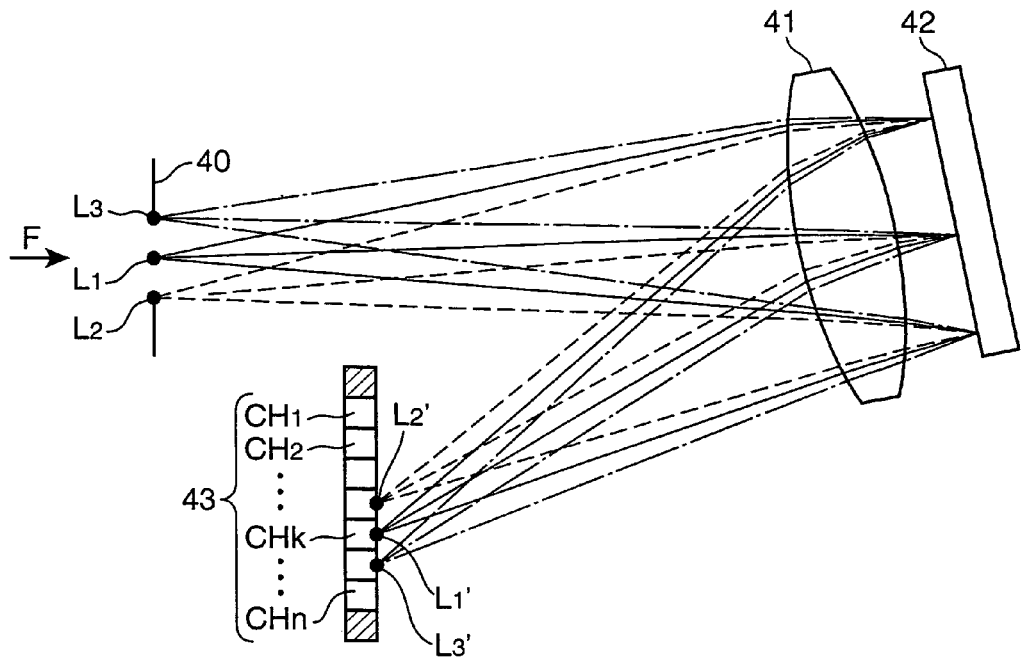
FIG. 9B
SLIT SHAPE= RECTANGULAR
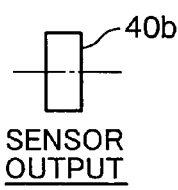
SENSOR OUTPUT
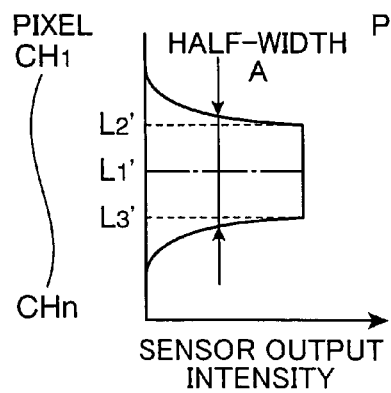
FIG. 9C
SLIT SHAPE= CIRCULAR
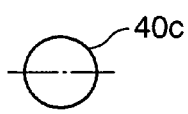
SENSOR OUTPUT
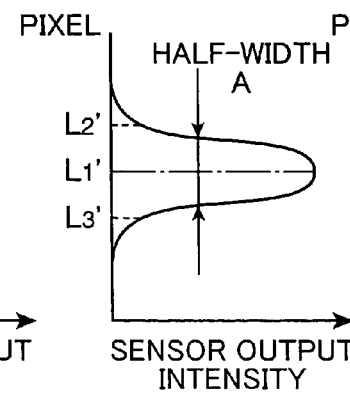
FIG. 9D
SLIT SHAPE= RHOMBIC
SENSOR OUTPUT
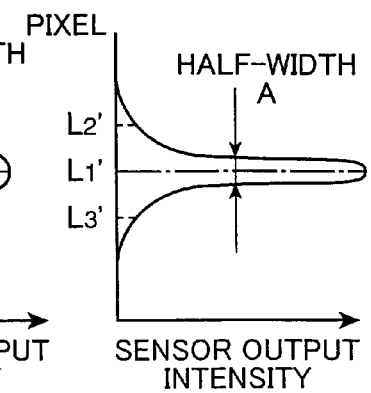

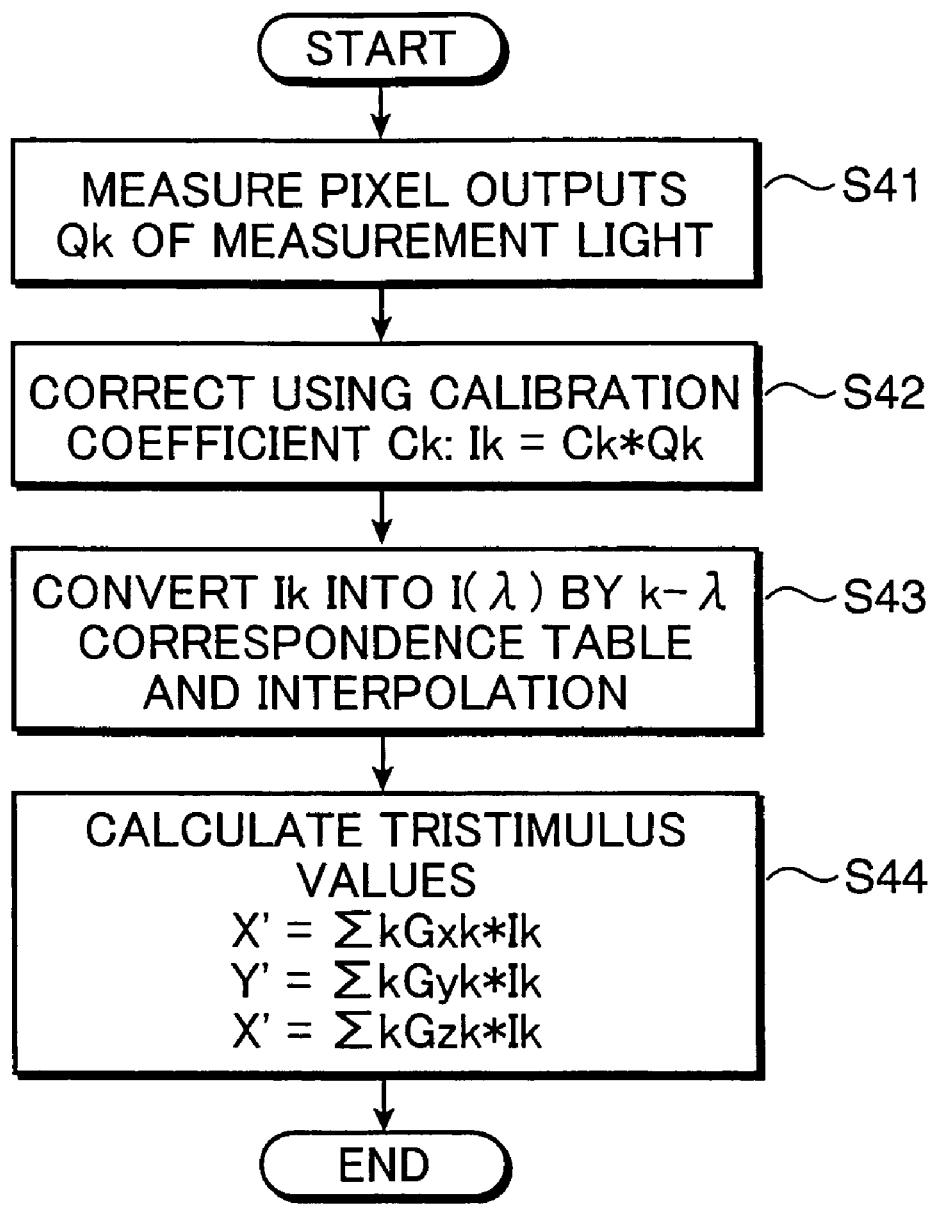

[EXAMPLE 1]
HALF-WIDTH A=30nm,
CENTER WAVELENGTH INTERVAL
B=10nm, A/B=3

FIG. 19A [COMPARATIVE EXAMPLE 1]
HALF-WIDTH A=10nm,
CENTER WAVELENGTH INTERVAL
B=10nm, A/B=1
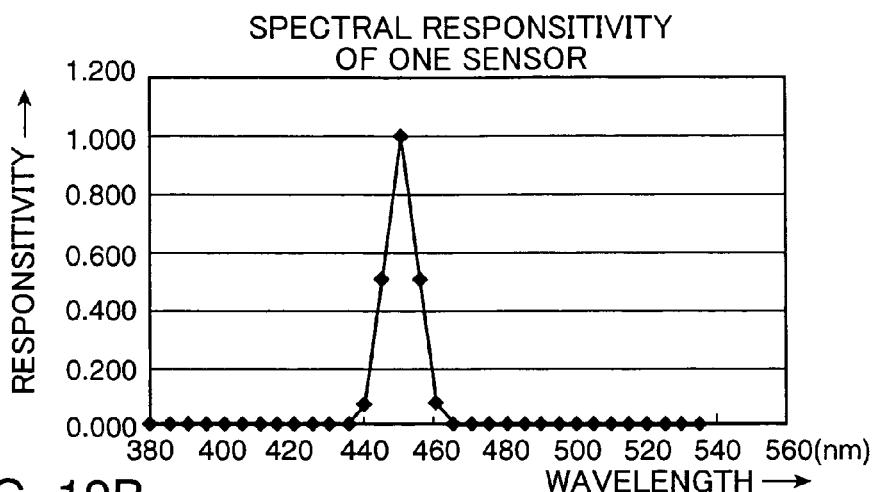
FIG. 19B
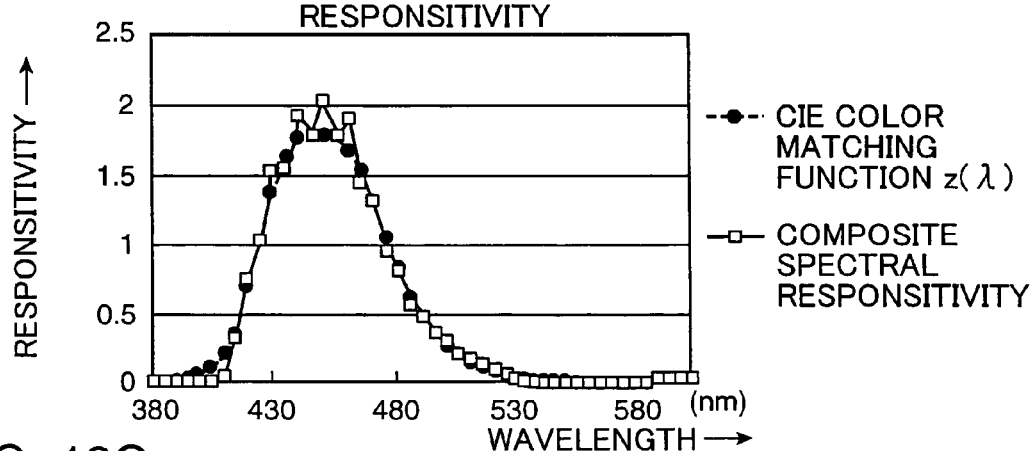
FIG. 19C
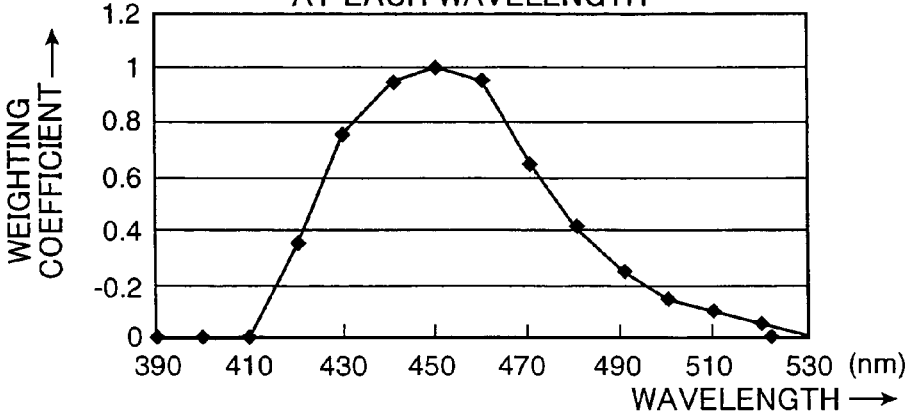

LIGHT MEASURING APPARATUS AND METHOD FOR MEASURING MONOCHROMATIC LIGHT

This application is based on patent application No. 2005-000583 filed in Japan, the contents of which are hereby incorporated by references.

BACKGROUND OF THE INVENTION

The present invention relates to a light measuring apparatus for obtaining characteristics of light from a light source or light to be measured such as light reflected by or transmitted through an illuminated sample and particularly to a spectral color meter for measuring color luminance values and the like of visible light (monochromatic light) and a method for measuring monochromatic light.

A color meter, one mode of a light measuring apparatus, for measuring color values of an incident light needs to have spectral responsitivities approximate to color matching functions of a standard observer recommended by the CIE (International Commission on Illumination). In recent years, with an increase of light sources for emitting a monochromatic light or a combination of monochromatic lights such as liquid crystal displays, plasma displays or LEDs (semiconductor light emitting devices), there has been an increasing demand for a further improvement in approximation precision to the color matching functions in order to improve the measurement precision of color values of these light sources.

Systems for realizing the spectral responsitivities approximate to the color matching functions include (a) a system by a color luminance meter directly reading stimulus values and (b) a system by a spectral luminance meter.

(a) The color luminance meter directly reading stimulus values builds filter characteristics approximate to the color matching function by combining a plurality of optical filters. This system has an advantage of compacting the light measuring apparatus since an optical system is simple and it is sufficient to provide a small number of light receiving sensors. However, there is a disadvantage of being difficult to meet a required approximation precision due to the restriction of usable filters and variations in the characteristics of the usable filters.

(b) The spectral luminance meter is for measuring spectral data at minute wavelength intervals using a narrow half power band width, for example, for measuring the luminance or chromaticity of a light to be measured (measurement light) from a spectral data obtained at wavelength pitches of 1 nm using a half power band width of about 5 nm (i.e., a visible wavelength region is covered by about 400 light receiving sensors). With such a spectral luminance meter, the spectral responsitivities can be caused to precisely coincide with the color matching functions, enabling highly precise luminance and chromaticity measurements, since the spectral data is obtained at the minute wavelength intervals. However, a bright optical system having a high resolving power is necessary in order to obtain spectral data as above, thereby presenting a problem of necessitating the use of a light measuring apparatus having a relatively large size.

In view of the above problems, there has been known a light measuring apparatus adopting a so-called spectral fitting method for conducting a measurement after obtaining a composite spectral responsitivity approximate to a specific spectral responsitivity by multiplying spectral responsitivities obtained at relatively long wavelength intervals (about several tens nm) using a wide half power band width by specified weights set beforehand. Such a light measuring apparatus is disclosed, for example, in Japanese Unexamined Patent Publication No. 2002-13981. Such a light measuring apparatus adopting the spectral fitting method has advantages that:

(I) The approximation precision of the spectral responsitivities is higher than the color luminance meter directly reading the stimulus values (a), (II) A light amount is larger and a signal-to-noise (S/N) ratio is higher since each light receiving channel lies in a wide wavelength region, and (III) A silicon photodiode array having better linearity, S/N ratio and dynamic range due to a smaller number of light receiving channel can be used, and it is not necessary to use a CCD (charged-coupled device) sensor array or a like electric charge transferring type sensor array inferior in these points.

Although the light measuring apparatus adopting the spectral fitting method has various merits as described above, the inventors of the present invention found out that the approximation precision of the composite spectral responsitivities might decrease unless the half power band width and the wavelength pitch (interval between center wavelengths of adjacent light receiving sensors) of the respective light receiving sensors used were optimized. Particularly, the influence of the decreased approximation precision is large in the measurement of color luminance values of monochromatic lights emitted from the aforementioned various displays and LEDs, with the result that there have been cases where the characteristics of the monochromatic lights could not be obtained with high precision.

SUMMARY OF THE INVENTION

It is an object of the present invention to provide a light measuring apparatus and a light measuring method which are free from the problems residing in the prior art.

According to an aspect of the present invention, a light measuring apparatus is provided with a spectral device for dispersing measurement light at each of specified wavelengths, a predetermined number of photoelectrical converters for receiving the dispersed measurement light and outputting light reception signals corresponding to the predetermined number of wavelengths, a storage device for storing the predetermined number of weight coefficients set beforehand to obtain a specified spectral responsitivity in accordance with the light reception signals outputted from the respective photoelectrical converters, and a calculator for calculating characteristics of the measurement light based on the specified spectral responsitivity using the respective light reception signals and the respective weight coefficients.

The spectral responsitivities and wavelength pitch of the respective photoelectrical converters are so determined as to satisfy the following conditions (1), (2):

$$B \geq 5 \text{ nm}, \tag{1}$$

$$A/B = 1.5 \text{ to } 4.0. \tag{2}$$

wherein A denotes a half power band width of the spectral responsitivities of the respective photoelectrical converters and B denotes a center wavelength interval of the spectral responsitivities of the respective photoelectrical converters.

A monochromatic light is measured using the above-mentioned light measuring apparatus by calculating a composite intensity by adding products of the light reception signals respectively outputted from the predetermined number of photoelectrical converters and specified weight coefficients for the approximation to a spectral responsivity of a specified color matching function, and calculating characteristics of the monochromatic light based on the composite intensity.

Accordingly, color luminance values and the like can be measured with high precision by maximally suppressing errors in the measurements of lights in a narrow band such as monochromatic lights.

These and other objects, features and advantages of the present invention will become more apparent upon a reading of the following detailed description and accompanying drawings.

BRIEF DESCRIPTION OF THE DRAWINGS

FIG. 6 is a graph showing color matching functions $x(\lambda)$, $y(\lambda)$, $z(\lambda)$ specified by the ICE and spectral responsivities $R_k(\lambda)$ of the respective light receiving channels $CH_k$;

FIGS. 9A to 9D are diagrams showing a method for setting the half power band width of the spectral responsivity;

FIG. 14 is a flowchart showing operations during a measurement;

FIGS. 19A to 19C are graphs showing data according to a first comparative example.

DETAILED DESCRIPTION OF THE PREFERRED EMBODIMENTS OF THE INVENTION

Hereinafter, embodiments of the present invention are described with reference to the accompanying drawings.

(Description of the Overall Construction of Light Measuring Apparatus)

Figure 1:
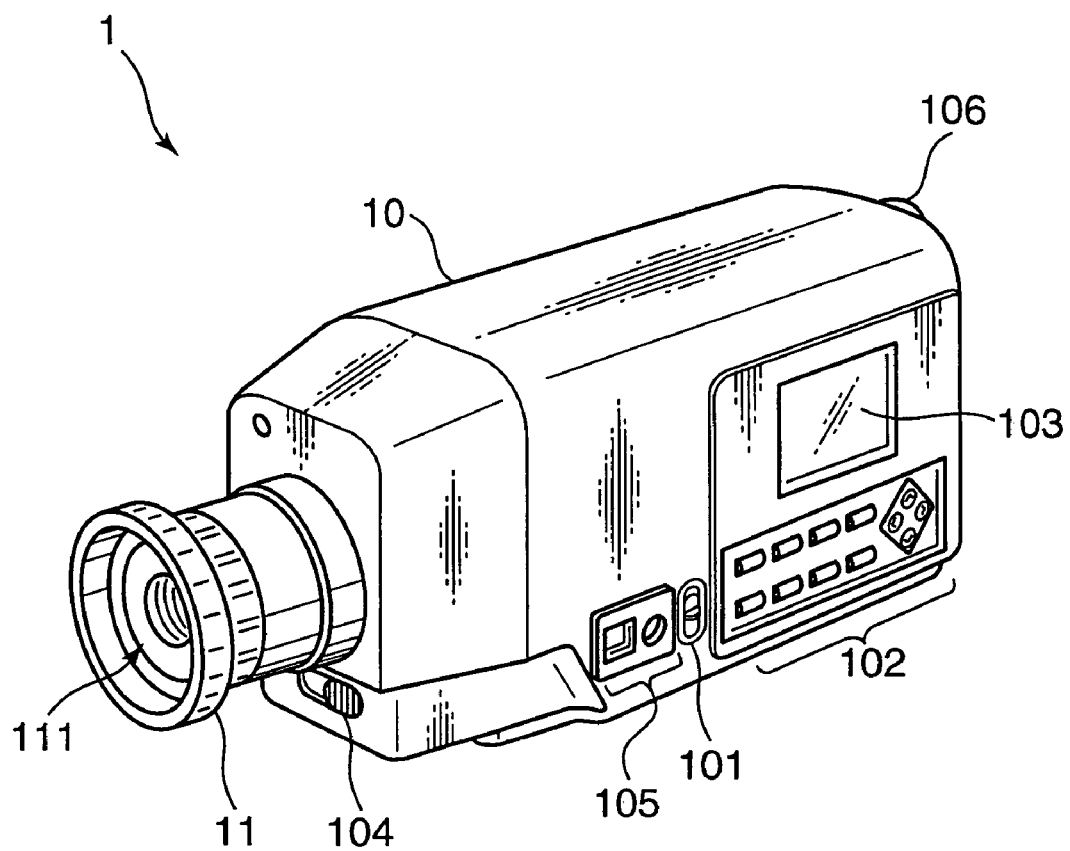
FIG. 1 is a perspective view diagrammatically showing an external configuration of a color luminance meter adopting the spectral fitting method as one embodiment of a light measuring apparatus according to the invention.

FIG. 1 is a perspective view diagrammatically showing an external configuration of a color luminance meter 1 adopting a spectral fitting method as one embodiment of a light measuring apparatus according to the present invention. This color luminance meter 1 is, in its appearance, comprised of a main unit 10 having a narrow and long box shape and accommodating respective elements including a spectral optical system (polychrometer) and a controller, and an objective lens unit 11 which is fixedly attached to one end of the main unit 10 and has an opening on which measurement light is incident.

The main unit 10 includes a power switch 101, an operable section 102 comprised of a plurality of operation keys and a cross-shaped button, a display 103 formed of a LCD or the like arranged on a side surface to display measurement results and the like, a measurement angle changeover switch 104 for switching a measurement angle in accordance with a measurement object, a connector portion 105 such as a USB terminal, and a finder 106 for enabling the visual confirmation of a measurement area. The objective lens unit 11 includes an objective lens 111.

Figure 2:
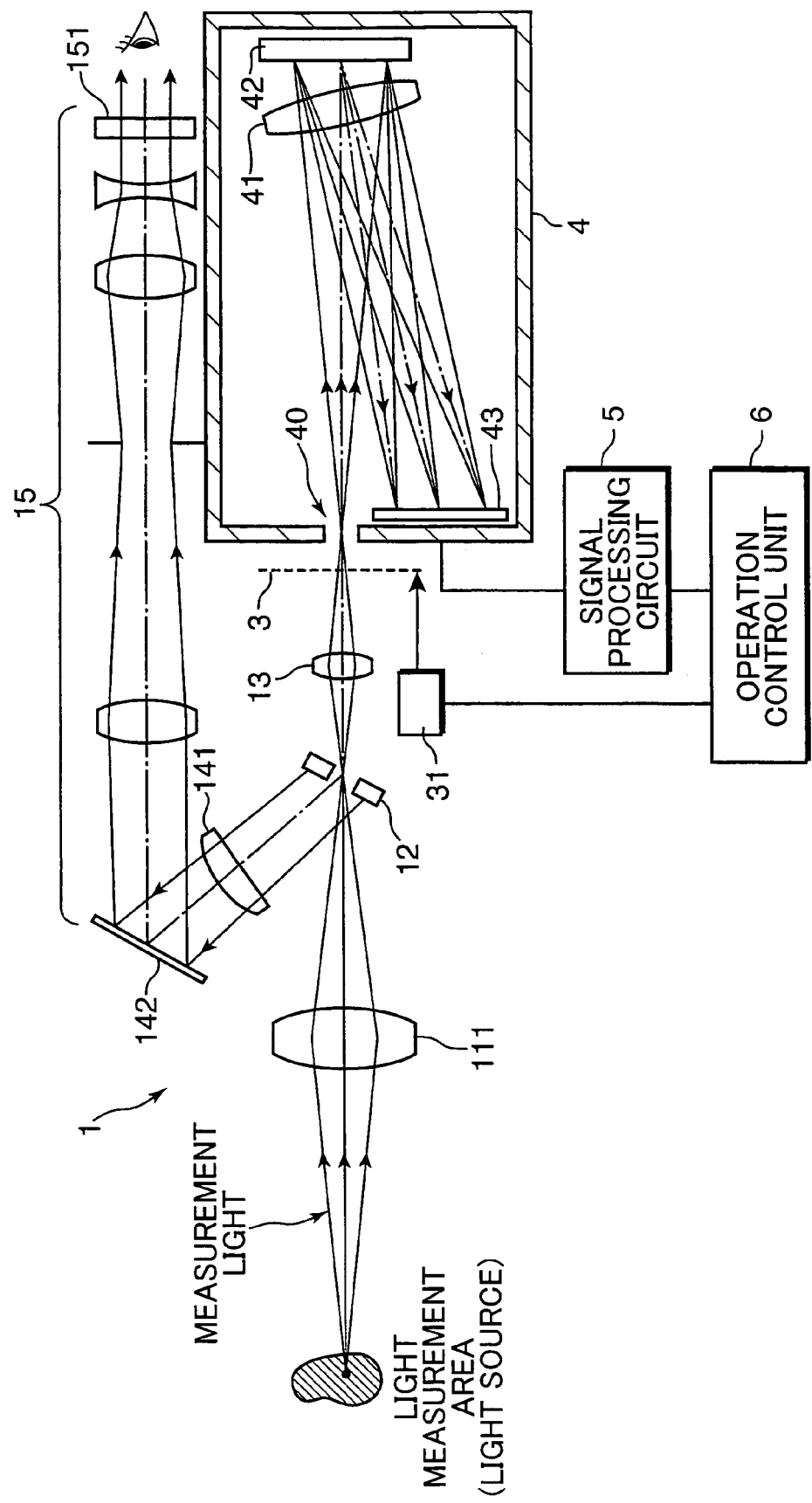
FIG. 2 is a block diagram diagrammatically showing an essential portion of an internal configuration of the color luminance meter.

FIG. 2 is a block diagram diagrammatically showing an essential portion of an internal configuration of the color luminance meter 1. This color luminance meter 1 includes the objective lens 111 forming an objective lens system; an aperture mirror 12; a light introducing lens 13 forming a light introducing optical system; a finder optical system 15; a polychrometer as a spectral optical system provided with a shutter 3, a shutter driving motor 31 and a photoelectrical converters; a signal processing circuit 5 and an operation control unit 6.

The objective lens 111 is adapted for introducing measurement light emitted from a specified light measurement area (light source) to an incidence slit 40 of the polychrometer 4 in cooperation with the light introducing lens 13 arranged therebehind. The measurement light (incident light) may be light reflected by a sample, light having transmitted through the sample, or light irradiated from the sample. In this embodiment, the measurement light is irradiated light. If this irradiated light is irradiated from a light source having a specified narrow wavelength band, particularly monochromatic light emitted from one of various displays such as an LCD (liquid crystal display) and a PDP (plasma display panel) and light sources such as a LED (semiconductor light emitting device), there is an advantage of being able to conduct a color luminance value measurement having less errors. This point is described in detail later.

The aperture mirror 12 is a mirror arranged on an incident light path of the measurement light on the polychrometer 4 and formed with an aperture for permitting the passage of fluxes of light from the light measurement area. Out of the measurement light incident from the objective lens 111, the fluxes of light from the light measurement area propagate straight to the light introducing lens 13 arranged behind the aperture mirror 12 after passing the aperture of the aperture mirror 12, but the fluxes of light outside the light measurement area are reflected by the aperture mirror 12 and are incident on the finder optical system 15 by way of an optical lens 141 and a reflection mirror 142.

The light introducing lens 13 is an optical system including a specified positive lens for causing the fluxes of light (measurement light) from the light measurement area having passed the aperture of the aperture mirror 12 to be incident on the incidence slit 40 of the polychrometer 4.

The finder optical system 15 is an optical system including the optical lens 141, the reflection mirror 142, a specified number of positive and negative lenses and a protection filter 151 for introducing the fluxes of light reflected by the aperture mirror 12 to the pupils of an observer. Since the fluxes of light having those from the light measurement area removed are incident on this finder optical system 15, a finder image is such that the light measurement is left out in black. Accordingly, the light measurement area can be confirmed without parallax. The protection filter 151 is formed of a light amount attenuating filter or the like for protecting the observer's eyes by suppressing the glare of the light and also functions to prevent the entrance of dusts into the finder optical system 15.

The shutter 3 is an opening/closing device having a function of shutting off a light path and, for example, is a disk-shaped member provided with a passing portion and a shutting portion. When the passing portion is disposed (shutter is open) at an intermediate position of the light path from the objective lens 111 to the incidence slit 40 of the polychrometer 4, the measurement light is incident on the polychrometer 4. On the other hand, when the shutting portion is arranged at an intermediate position of the light path (shutter is closed), the measurement light is not incident on the polychrometer 4. The shutter driving motor 31 opens and closes the shutter 3 as above in accordance with a control signal outputted from the operation control unit 6.

The polychrometer 4 forms the spectral optical system and includes the incidence slit 40, a collimating lens 41 as a focusing optical system, a grating (diffraction grating) 42 as a wavelength dispersing means, and a light receiving sensor array 43 (photoelectric conversion means) comprised of n (n is an integer equal to or greater than 2) light receiving sensors.

The incidence slit 40 is a circular slit formed in a side wall of the polychrometer 4, and the measurement light is introduced to the inside of the polychrometer 4 through the incidence slit 40 as described above. The collimating lens 41 introduces the measurement light having passed the incidence slit 40 to the grating 42 after making it into a parallel light, and causes a dispersed image of the incidence slit 40 dispersed by the grating 42 to be focused on a sensing surface of the light receiving sensor array 43. The grating 42 has a function of reflecting and dispersing the incident measurement light according to wavelength, thereby enabling the dispersed image of the incidence slit 40 to be focused on the light receiving sensor array 43.

Figure 3:
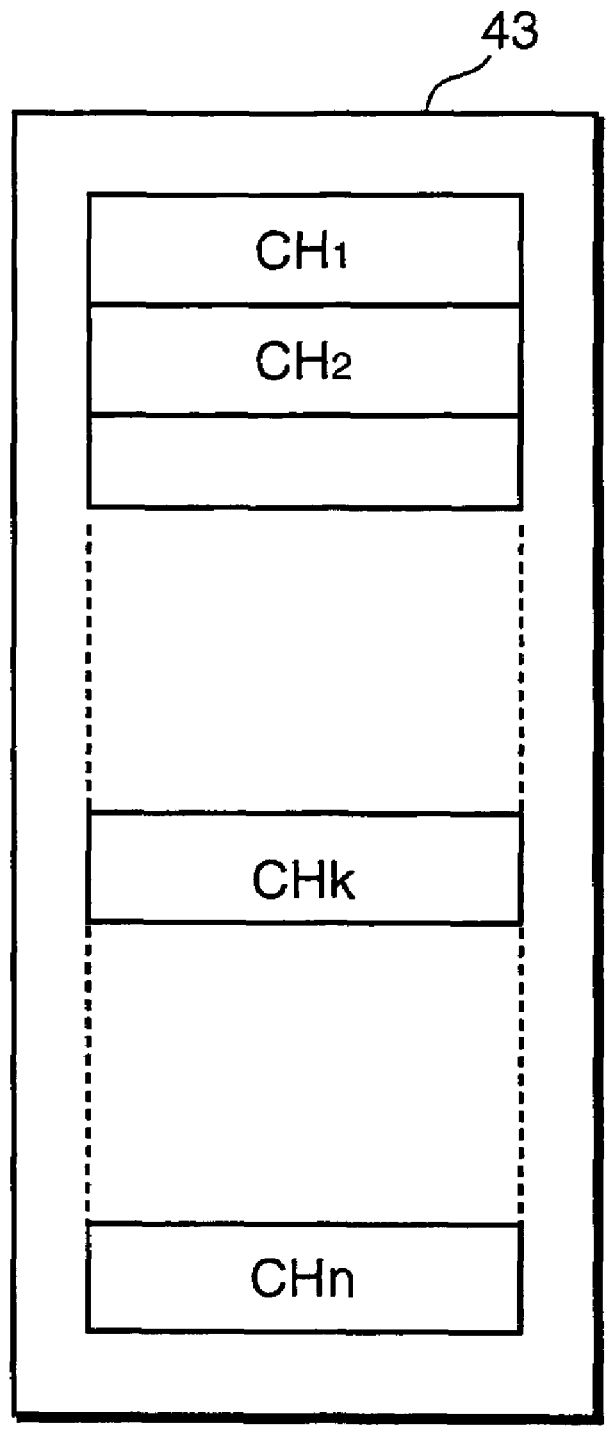
FIG. 3 is a diagram showing light receiving channels of a light receiving sensor array.

The light receiving sensor array 43 is provided with n light receiving channels (pixels) $CH_1$ to $CH_n$ arrayed at a specified interval. The light receiving channels $CH_k$ (k is a pixel or channel number and=0 to n) are formed, for example, by a silicon photodiode array in which silicon photodiodes are arrayed in one row (may be arrayed in a plurality of rows) as shown in FIG. 3, and the dispersed image of the incidence slit 40 dispersed according to wavelength is focused on the light receiving surfaces of the respective silicon photodiodes. Electrical signals (light reception signals) corresponding to the intensities of the received lights and outputted from the respective light receiving channels $CH_k$ are processed in the signal processing circuit 5 and the operation control unit 6 to measure the spectral intensity of the measurement light (and color luminance values based on this spectral intensity). This embodiment is characterized in that parameters of the respective light receiving sensors in the light receiving sensor array 43, i.e., a half power band width A of spectral responsitivities of the respective light receiving sensors and a center wavelength interval B (wavelength pitch) between center wavelengths of the respective light receiving sensors are optimized. This point is described in detail later.

Figure 4:
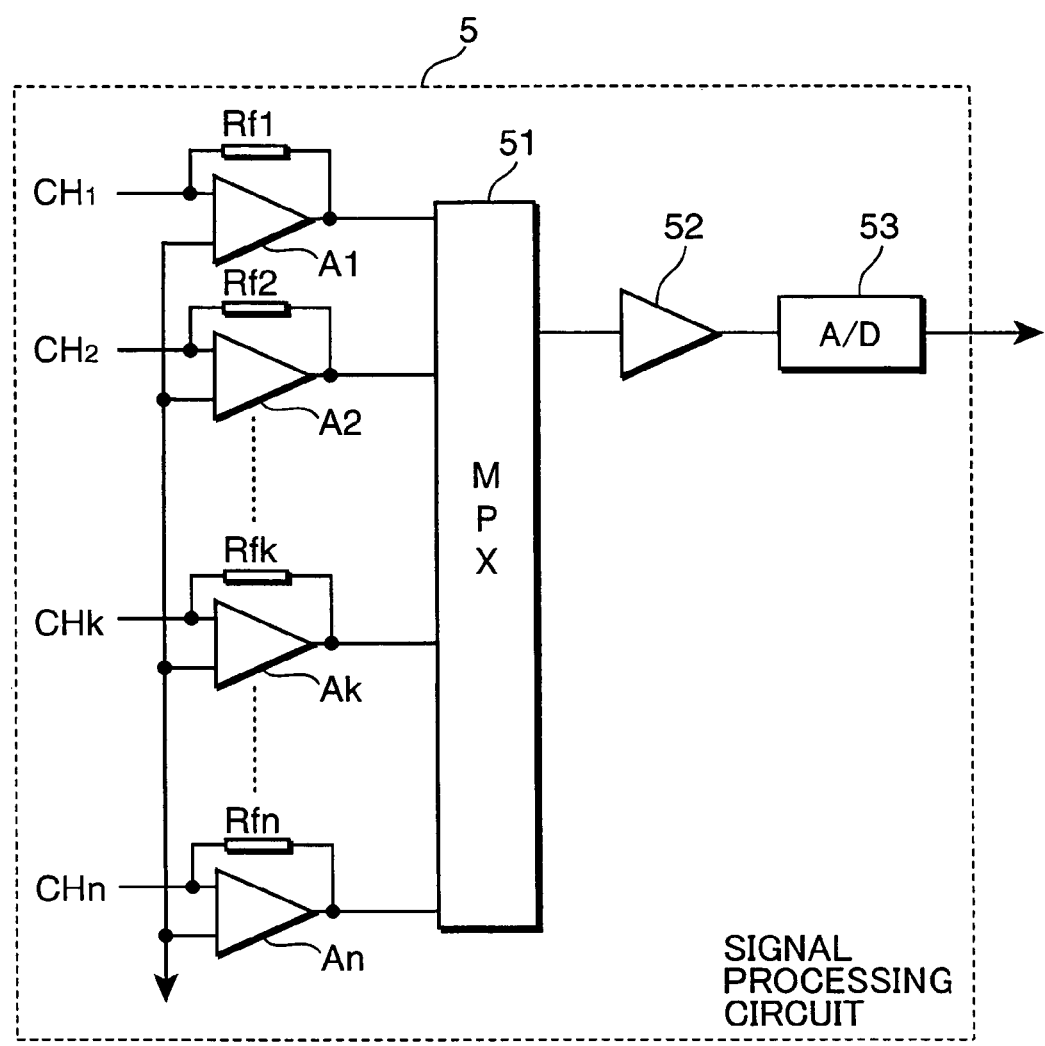
FIG. 4 is a block diagram showing a circuit construction of a signal processing circuit.

The signal processing circuit 5 amplifies and digitally converts the analog light reception signals outputted from the respective light receiving channels $CH_1$ to $CH_n$. FIG. 4 is a block diagram showing the construction of the signal processing circuit 5. This signal processing circuit 5 is provided with current-to-voltage converting circuits $A_k$ including feedback resistors $Rf_k$ arranged for the respective light receiving channels $CH_k$, a multiplexer 51 for successively selecting outputs of the current-to-voltage converting circuits $A_k$ one by one, a variable gain amplifier 52 for amplifying an output of the multiplexer 51, and an analog-to-digital converter 53 for converting an analog signal outputted from the variable gain amplifier 52 into a digital signal.

The dispersed lights (dispersed image of the incidence slit) incident on the respective light receiving channels $CH_1$ to $CH_n$ of the sensor array 43 are converted into currents by the photoelectrically converting function of the respective photodiodes, and these currents are converted into voltage signals by the current-to-voltage converting circuits $A_k$ connected with the respective pixels. The voltage signals of the respective pixels outputted from the current-to-voltage converting circuits $A_k$ are successively selected and extracted in the multiplexer 51 controlled by the operation control unit 6. The voltage signals are amplified in the variable gain amplifier 52 and converted in the analog-to-digital converter 53 into digital signals, which are then sent to the operation control unit 6.

Figure 5:
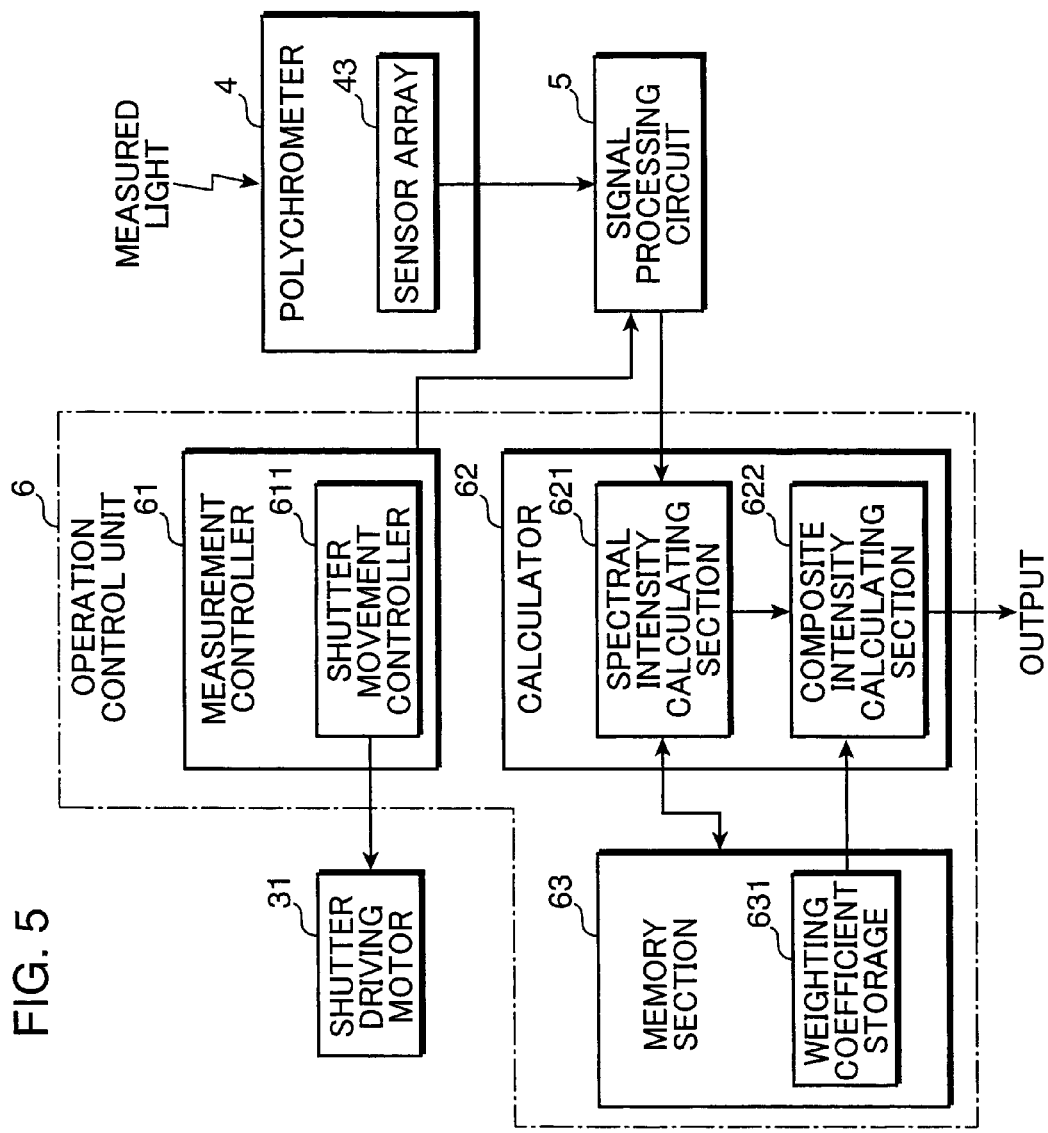
FIG. 5 is a function block diagram of an operation control unit.

The operation control unit 6 includes, for example, a CPU (central processing unit) and an EEPROM (electrically erasable programmable storage medium) and controls the overall operation of the color luminance meter 1. Specifically, the operation control unit 6 controls the operations of the respective parts to measure the spectral intensity of the measurement light and calculates the color luminance values using specified spectral responsitivities. FIG. 5 shows a function block diagram of the operation control unit 6. The operation control unit 6 includes a measurement controller 61, a calculator 62 and a memory section 63.

The measurement controller 61 sends control signals to the respective parts to control a measuring operation upon measuring the characteristics of the measurement light. For example, a shutter movement controller 611 of the measurement controller 61 drives the shutter driving motor 31 during the measurement to open the shutter 3, thereby permitting the measurement light having passed the objective lens 111 and the light introducing lens 13 to be incident on the slit 40 of the polychrometer 4. The shutter movement controller 611 drives the shutter driving motor 31 to close the shutter 3, thereby shutting off the incidence of the measurement light, at a time of an offset signal measurement to be described later. The measurement controller 61 gives a control signal to the signal processing circuit 5 for controlling the selecting operation of the multiplexer 51.

The calculator 62 calculates the spectral intensity of the measurement light incident on the light receiving sensor array 43 and obtains the characteristics of the measurement light based on a composite spectral responsivity approximate to a specified spectral responsivity by adding products of the spectral responsivities of the respective light receiving channels $CH_1$ to $CH_n$ and specified weighting coefficients. This calculator 62 is comprised of a spectral intensity calculating section 621 and a composite intensity calculating section 622.

The spectral intensity calculating section 621 receives the outputs (light reception signals) of the respective light receiving channels $CH_1$ to $CH_n$ of the light receiving sensor array 43 on which the dispersed image of the incidence slit 40 is focused as the digital signal data from the signal processing circuit 5 during the measurement (shutter 3 is "open"), and temporarily saves them in a RAM or the like of the memory section 63. Subsequently, the spectral intensity calculating section 621 receives the digital signal data (offset signals) from the signal processing circuit 5 with the measurement light shut out during the offset signal measurement (shutter 3 is "closed"). The spectral intensity calculating section 621 calculates pixel output data $I_k$ of the measurement light having offsets removed by subtracting the offset signals from the measurement data previously received.

The composite intensity calculating section 622 calculates the characteristics of the measurement light based on the specified spectral responsivity obtained by multiplying the spectral intensity data $I_k$ obtained in the spectral intensity calculating section 621 by the weighting coefficients set beforehand and adding the resulting products. Specifically, data X', Y', Z' (composite intensities) approximate to tristimulus values X, Y, Z given by CIE color matching functions $x(\lambda)$, $y(\lambda)$, $z(\lambda)$ are obtained by multiplying the spectral intensity data $I_k$ by the weighting coefficients $Gx_k$, $Gy_k$, $Gz_k$ for compositing the CIE color matching functions $x(\lambda)$, $y(\lambda)$, $z(\lambda)$, which are saved in a weighting coefficient storage 631 of the memory section 63 to be described later, and adding the resulting products.

A calculating technique (spectral fitting method) used in the composite intensity calculating section 622 is described with reference to FIGS. 6 and 7. FIG. 6 is a graph showing the CIE color matching functions $x(\lambda)$, $y(\lambda)$, $z(\lambda)$ and the spectral responsivities $R_k(\lambda)$ (corresponding to the above pixel output data $I_k$) of the respective light receiving channels $CH_k$. In an example shown in FIG. 6, the light receiving sensors are arrayed at the wavelength pitches of 10 nm (center wavelength interval=10 nm) in a visible wavelength region (410 nm to 710 nm). Accordingly, n=31 (k=1 to 31) light receiving channels (light receiving sensors) $CH_k$ is provided in the light receiving sensor array 43 in this case.

Figure 7A:
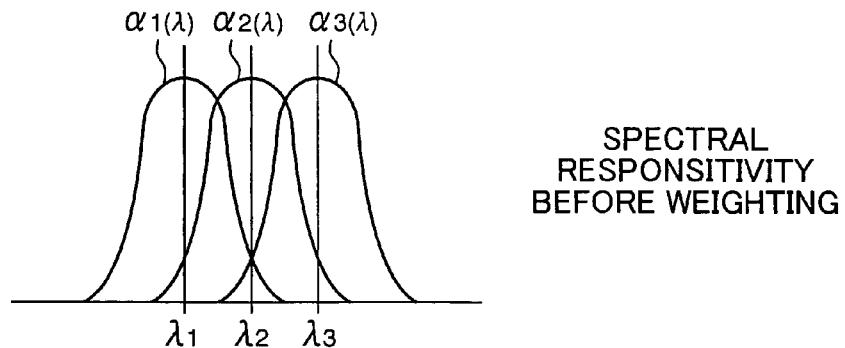
FIGS. 7A to 7C are graphs showing a generation process of a composite spectral responsivity.
Figure 7B:
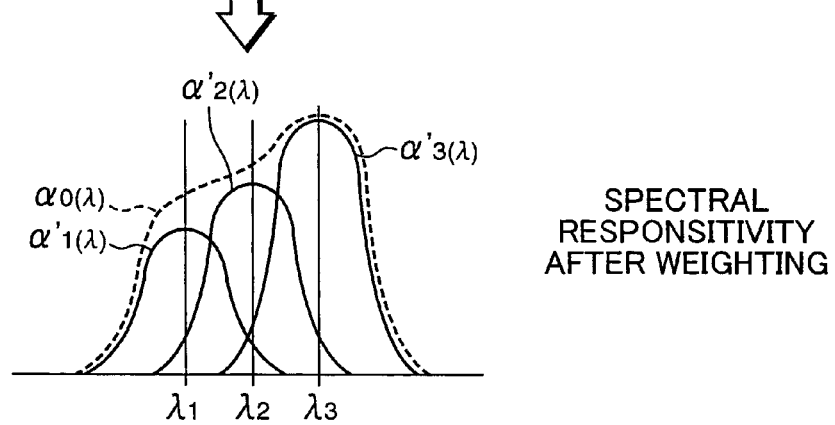
Figure 7C:
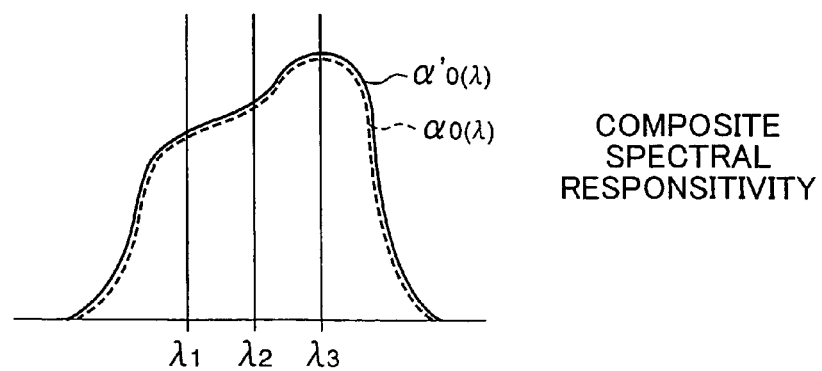

In order to obtain the composite intensity values X', Y', Z' given by the composite spectral responsivities $xg(\lambda)$, $yg(\lambda)$, $zg(\lambda)$ approximate to the color matching functions $x(\lambda)$, $y(\lambda)$, $z(\lambda)$ shown in FIG. 6, the composite intensity calculating section 622 multiplies the pixel output data $I_k$ obtained in the spectral intensity calculating section 621 by the weighting coefficients $Gx_k$, $Gy_k$, $Gz_k$ and adds the resulting products. FIGS. 7A to 7C are graphs showing a generating process of the above composite spectral responsivities. As shown in FIG. 7A, it is assumed that spectral responsivities $\alpha_1(\lambda)$, $\alpha_2(\lambda)$, $\alpha_3(\lambda)$ of center wavelengths $\lambda_1$, $\lambda_2$, $\lambda_3$ are obtained as spectral responsivities before weighting (these spectral responsivities $\alpha_1(\lambda)$, $\alpha_2(\lambda)$, $\alpha_3(\lambda)$ correspond to the spectral responsivities $R_k(\lambda)$ obtained in the spectral intensity calculating section 621).

If a target spectral responsivity $\alpha_0(\lambda)$ (corresponding to the color matching functions $x(\lambda)$, $y(\lambda)$, $z(\lambda)$) is determined as shown by dotted line in FIG. 7B, the three spectral responsivities $\alpha_1(\lambda)$, $\alpha_2(\lambda)$, $\alpha_3(\lambda)$ are weighted (corresponding to the multiplication by the weighting coefficients $Gx_k$, $Gy_k$, $Gz_k$) so that a composite of the spectral responsivities $\alpha_1(\lambda)$, $\alpha_2(\lambda)$, $\alpha_3(\lambda)$ maximally approximates to the target spectral responsivity $\alpha_0(\lambda)$. As a result of this weighting, the spectral responsivities $\alpha_1(\lambda)$, $\alpha_2(\lambda)$, $\alpha_3(\lambda)$ are converted into weighted spectral responsivities $\alpha_1'(\lambda)$, $\alpha_2'(\lambda)$, $\alpha_3'(\lambda)$ as shown in FIG. 7B. If these weighted spectral responsivities $\alpha_1'(\lambda)$, $\alpha_2'(\lambda)$, $\alpha_3'(\lambda)$ are composited (added), the composite spectral responsivity $\alpha_0'(\lambda)$ approximates to the target spectral responsivity $\alpha_0(\lambda)$ as shown in FIG. 7C. Here, as the approximation precision of the composite spectral responsivity $\alpha_0'(\lambda)$ to the target spectral responsivity $\alpha_0(\lambda)$ is higher, the light measurement can be conducted with the spectral responsivity more approximate to the desired target spectral responsivity $\alpha_0(\lambda)$ (i.e., color luminances can be measured with high precision).

For example, the composition of the color matching function $z(\lambda)$ is specifically described. The spectral responsivities $R_k(\lambda)$ of the respective light receiving channels $CH_k$ shown in FIG. 6 are multiplied by the weighting coefficients $Gz_k$ different for the respective channels and the resulting products are added, thereby obtaining the composite spectral responsivity $zg(\lambda)$ approximate to the specified color matching function $z(\lambda)$. As is clear from FIG. 6, the weighting coefficients $Gz_k$ are large with k=6 as a center, decrease toward the opposite sides and become substantially 0 at k>16. The weighting coefficients $Gz_k$ are obtained, for example, by the least squares method so as to minimize a difference between the composite spectral responsivity $zg(\lambda)$ and the specified spectral responsivity $z(\lambda)$. Similarly, the weighting coefficients $Gx_k$, $Gy_k$ (k=1 to 31) can be so obtained as to minimize differences between the composite spectral responsivities $xg(\lambda)$, $yg(\lambda)$ and the specified spectral responsivities $x(\lambda)$, $y(\lambda)$.

Referring back to FIG. 5, the memory section 63 includes a ROM, a RAM or the like. A control program and the like for the measuring operation are stored in the memory section 63 and measurement data and the like given from the aforementioned signal processing circuit 5 are temporarily saved therein. Further, (3n) weighting coefficients $Gx_k$, $Gy_k$, $Gz_k$ set based on the spectral responsivities $R_k(\lambda)$ of the respective light receiving channels $CH_1$ to $CH_n$ measured during the production process are saved in the weighting coefficient storage 631 of the memory section 63. Calibration coefficients and the like used for the sensitivity calibration in the spectral intensity calculating section 621 are also saved in the memory section 63.

(Concerning the Half Power Band Width of the Light Receiving Sensor and the Center Wavelength Interval)

Figure 8:
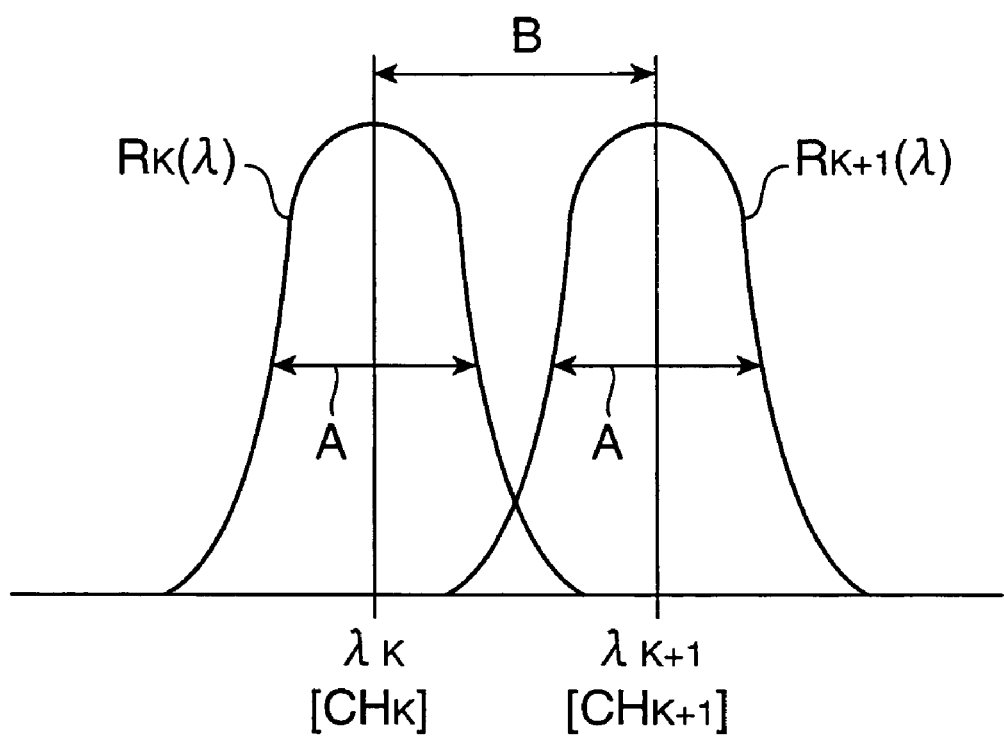
FIG. 8 is a graph showing a relationship between a half power band width of spectral responsivities and a center wavelength interval of the respective light receiving sensors.

In the color luminance meter 1 thus constructed, the half power band widths of the spectral responsivities of the respective light receiving sensors and the center wavelength interval (wavelength pitch) of the respective light receiving sensors (wavelength intervals) are selected from specific ranges in order to enable a light measurement of high precision. Specifically, when it is assumed that A denotes the half power band width of the spectral responsivities of the respective light receiving sensors and B denotes an interval (wavelength pitch) between center wavelengths $\lambda_k$ and $\lambda_{k+1}$ of the spectral responsivities $R_k(\lambda)$ and $R_{k+1}(\lambda)$ of adjacent light receiving sensors (light receiving channels $CH_k$ and $CH_{k+1}$) as shown in FIG. 8, the half power band width A and the center wavelength interval B are set such that the center wavelength interval B≧5 nm, and the half power band width A/center wavelength interval B=1.5 to 4.0.

In this case, it is desirable that the center wavelength interval B lies within a range between 5 nm and 35 nm (5 nm≦B≦35 nm).

It is particularly desirable that the center wavelength interval B and a ratio of the half power band width A to the center wavelength interval B are:

7 nm≦B≦13 nm, and

A/B=2.5 to 3.5.

For example, the center wavelength interval B (wavelength pitch) of 10 nm and the half power band width A of 30 nm (A/B=3) as shown in FIG. 6 is one of particularly preferable choices.

The half power band width A can be adjusted by suitably setting the diameter of a spot of light incident on each light receiving sensor of the light receiving sensor array 43. FIGS. 9A to 9D are diagrams showing the half power band width A. As shown in FIG. 9A, a ray of light incident through a middle part L1 of the incidence slit 40 having a hole of a specified shape is focused on a focusing point L1' of the light receiving sensor array 43 by way of the collimating lens 41 and the grating 42. Similarly, a ray of light incident through a bottom end L2 of the incidence slit 40 is focused on a focusing point L2', and a ray of light incident through an upper end L3 of the incidence slit 40 is focused on a focusing point L3'.

FIGS. 9B to 9D are diagrams showing a relationship between the shape of the incidence slit 40 and the output of the light receiving sensor array 43 (sensor output). Here are illustrated cases where the shape of the incidence slit 40 is rectangular, circular and rhombic. It should be noted that the respective shapes of the slits are those when viewed in a direction of arrow F of FIG. 9A. The sensor outputs are shown with the array of the light receiving channels (pixels) $CH_1$ to $CH_n$ of the light receiving sensor array 43 along vertical axis and with the sensor output intensity along horizontal axis.

The half power band width A is described with reference to FIG. 9B showing a rectangular slit 40b as the incidence slit 40. In the case that the optical system of the polychrometer 4 is an ideal system, the sensor output obtained is a rectangular output within a range between focusing points L2' and L3' (shown in dotted line in a sensor output graph of FIG. 9B). However, in reality, ends of the rectangular range come to be inclined due to the optical deterioration brought about by the collimating lens 41 and the grating 42, with the result that the sensor output takes an intensity as shown in solid line in FIG. 9B. The half power band width A when this rectangular slit 40b is used is an intensity width at 50% of a peak value of the sensor output intensity. This holds for cases where the incidence slit 40 is a circular slit 40c as shown in FIG. 9C and the incidence slit 40 is a rhombic slit 40d as shown in FIG. 9D.

An area of the incidence slit 40 is in proportion to an amount of light usable in the polychrometer 4. Specifically, the larger the area of the incidence slit 40, the larger amount of light (higher sensitivity) the polychrometer 4 has. On the other hand, the shape of the incidence slit 40 influences a sensor output intensity distribution (spectral responsivity).

In other words, a desired half power band width A can be obtained by suitably selecting the shape of the incidence slit 40.

More specifically, since the incidence slit 40b is rectangular in FIG. 9B, the spectral responsivity takes such a shape approximate to a trapezoid having a relatively wide half power band width A. On the other hand, since there is a large amount of light at the focusing point L1' corresponding to the ray of light at a slit center L1 and there is a small amount of light corresponding to the rays of light at the bottom end L2 and the upper end L3 with the rhombic slit 40d of FIG. 9D, the spectral responsivity takes such a shape suddenly increases in the middle. In other words; the spectral responsivity takes a shape having a relatively narrow half power band width A. Further, with the circular slit 40c of FIG. 9C, the spectral responsivity takes such a shape in-between the one resulting from the rectangular slit 40b and the one resulting from the rhombic slit 40d, i.e., a shape approximate to a Gaussian curve. In other words, the half power band width A takes a medium value.

In this way, the incidence slit 40 can take various shapes and a suitable shape can be selected depending on a desired half power band width A. However, in view of precise fitting in the spectral fitting method, it is desirable to adopt the circular slit 40c of FIG. 9C. As described above, in the case of the circular slit 40c, the shape of the spectral responsivity approximates to the Gaussian curve. However, since the composite spectral responsivity is created by compositing a plurality of sensor outputs according to the spectral fitting method as described with reference to FIG. 7, the spectral responsivities of the respective outputs can be thought as frequency components. If the spectral responsivity takes a shape approximate to a Gaussian curve, it is easier to create a composite spectral responsivity having a better fitting property as compared to a rectangular shape or a too pointed shape.

The half power band width A can be suitably set not only by adjusting the shape and size of the incidence slit 40 as described above, but also by adjusting the optical characteristics and the optical arrangements of the incidence slit 40, the collimating lens 41, the grating 42 and the light receiving sensor array 43.

(Description of the Operation)

Figure 10:
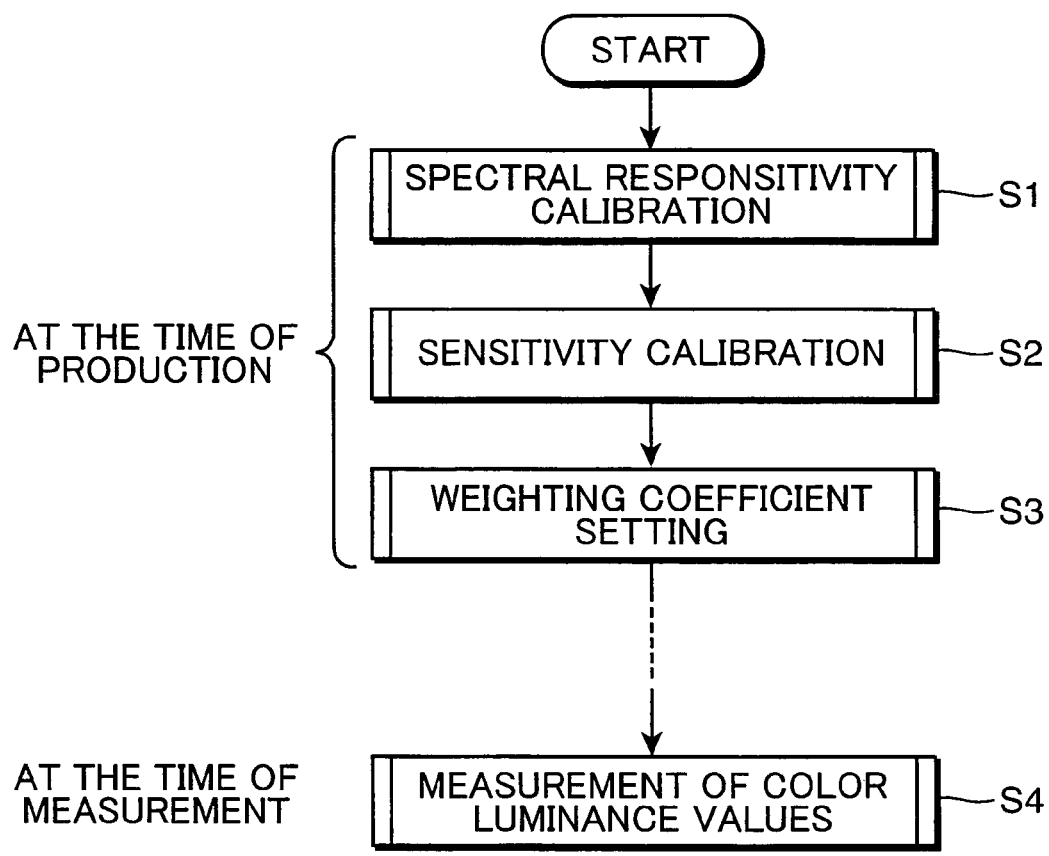
FIG. 10 is a flowchart showing the overall operation of the color luminance meter.

Next, the operation of the color luminance meter 1 constructed as above is described. FIG. 10 is a flowchart showing such an operation. The operation flow can be roughly divided into operation steps (various settings) carried out at the time of producing the color luminance meter 1 and operation steps for actually measuring the color luminance values using the color luminance meter 1. At the time of production, a spectral responsivity calibration (Step S1), a sensitivity calibration (Step S2) and a weighting coefficient setting (Step S3) are successively carried out. At the time of a measurement, a color luminance value measuring step (Step S4) is carried out.

During the spectral responsivity calibration in Step S1, which spectral responsivities $R_k(\lambda)$ the respective light receiving channels $CH_k(\lambda)$ of the sensor array 43 possess is obtained and temporarily saved in the memory section 63 or the like. During the sensitivity calibration of Step S2, calibration coefficients $C_k$ for calibrating the sensitivities of the respective light receiving channels $CH_k$ are obtained and saved in the memory section 63 or the like. The weighting coefficient setting in Step S3 is a unique step required to carry out the spectral fitting method. In this step, the weighting coefficients $Gx_k$, $Gy_k$, $Gz_k$ used to composite the CIE color matching functions x(λ), y(λ), z(λ) are calculated using the spectral responsivities $R_k(\lambda)$ calculated in Step S1 and saved in the weighting coefficient storage 631. During the measurement (Step S4), the tristimulus values X', Y', Z' approximate to the tristimulus values X, Y, Z given by the CIE color matching functions x(λ), y(λ), z(λ) are calculated using the weighting coefficients $Gx_k$, $Gy_k$, $Gz_k$. The respective steps are successively described below.

<Step S1: Spectral Responsivity Calibration>

Figure 11:
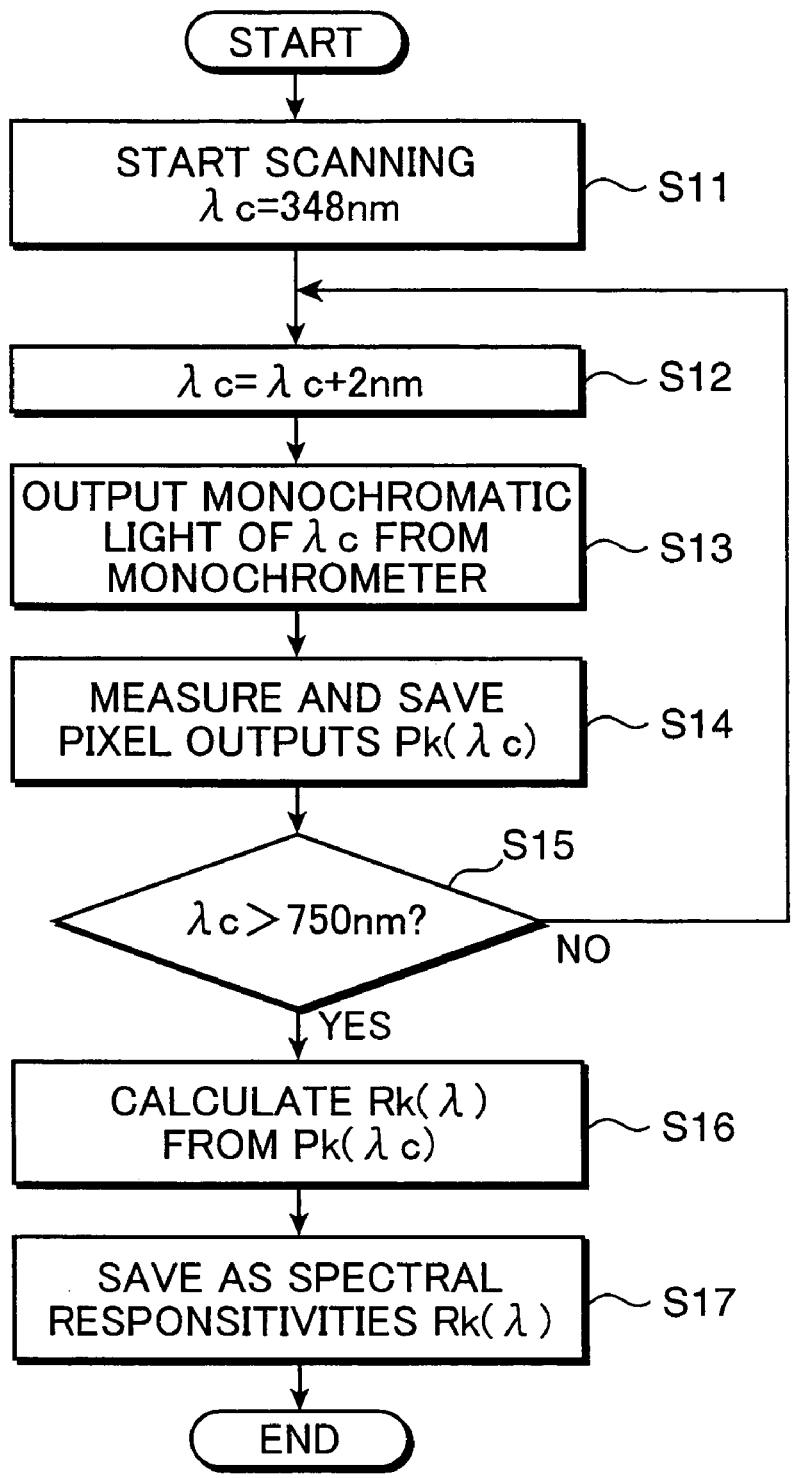
FIG. 11 is a flowchart showing operations during a spectral responsivity calibration.

FIG. 11 is a flowchart showing a flow of the spectral responsivity calibration. Here, the spectral responsivities of the respective light receiving channels $CH_k$ (k=1 to n) of the sensor array 43 are measured by causing single waves as a basis to be successively incident on the color luminance meter 1 while shifting the wavelength. This measurement is, for example, such that a reference monochrometer is arranged to face the objective lens 111 and single waves having an equal energy and a half power band width of about 2 nm are caused to be successively incident on the incidence slit 40 of the polychrometer 4 at wavelength pitches of 2 nm (scanning pitches=2 nm) from the reference monochrometer. A range of wavelength scanning is such that the spectral responsivities $R_1(\lambda X)$, $R_n(\lambda)$ of the pixels (light receiving channel $CH_1$ and $CH_n$) at the opposite ends of a measurement region of, for example, 400 to 700 nm trail. For example, this range of wavelength scanning is a wavelength region of 350 to 750 nm.

In this case, as shown in the flowchart of FIG. 11, the center wavelength λc of the single wave is set at 348 nm as an initial value (Step S11), the wavelength of the first single wave to be emitted by way of an addition routine of λc=λc+2 nm in accordance with the scanning pitches of 2 nm is determined (Step S12), and the single wave having the center wavelength λc=350 nm is emitted from the monochrometer (Step S13). This single wave having the center wavelength λc=350 nm is incident on the incidence slit SL, and outputs sensed at the respective light receiving channels $CH_k$ of the sensor array 43 at this time are sent to the operation control unit 6 as outputs $P_k$ (350 nm) of the respective pixels in relation to the center wavelength λc=350 nm and are temporarily saved in the memory section 63 in relation to the center wavelength λc=350 nm (Step S14). Then, whether or not λc>750 nm is judged (Step S15) and Steps S11 to S14 are repeated at the scanning pitches of 2 nm until λc>750 nm (YES in Step S15).

Such measurements are carried out in the wavelength region of 350 to 750 nm, the respective pixel outputs $P_k(\lambda c)$ at the respective center wavelengths λc are plotted on an axis of wavelength, whereby the relative spectral responsivities $R_k(\lambda)$ of the respective light receiving channels $CH_k$ are obtained (Step S16). In this way, the spectral responsivities $R_k(\lambda)$ of all the light receiving channels $CH_k$ (k=1 to 31 in this example) in the entire wavelength region λ of 350 to 750 nm are obtained. Then, the relative spectral responsivities $R_k(\lambda)$ based on the respective pixel outputs $P_k(\lambda c)$ are saved as the spectral responsivities $R_k(\lambda)$ of the respective light receiving channels $CH_1$ to $CH_n$ in the memory section 63 (Step S17). The weighting coefficients $Gx_k$, $Gy_k$, $Gz_k$ to be described later are calculated as weights for the spectral responsivities $R_k(\lambda)$. Barycentric wavelengths (center wavelengths) $W_{ck}$ of the respective pixels are also calculated from the thus calculated relative spectral responsivities $R_k(\lambda)$.

<Step S2: Sensitivity Calibration>

Figure 12:
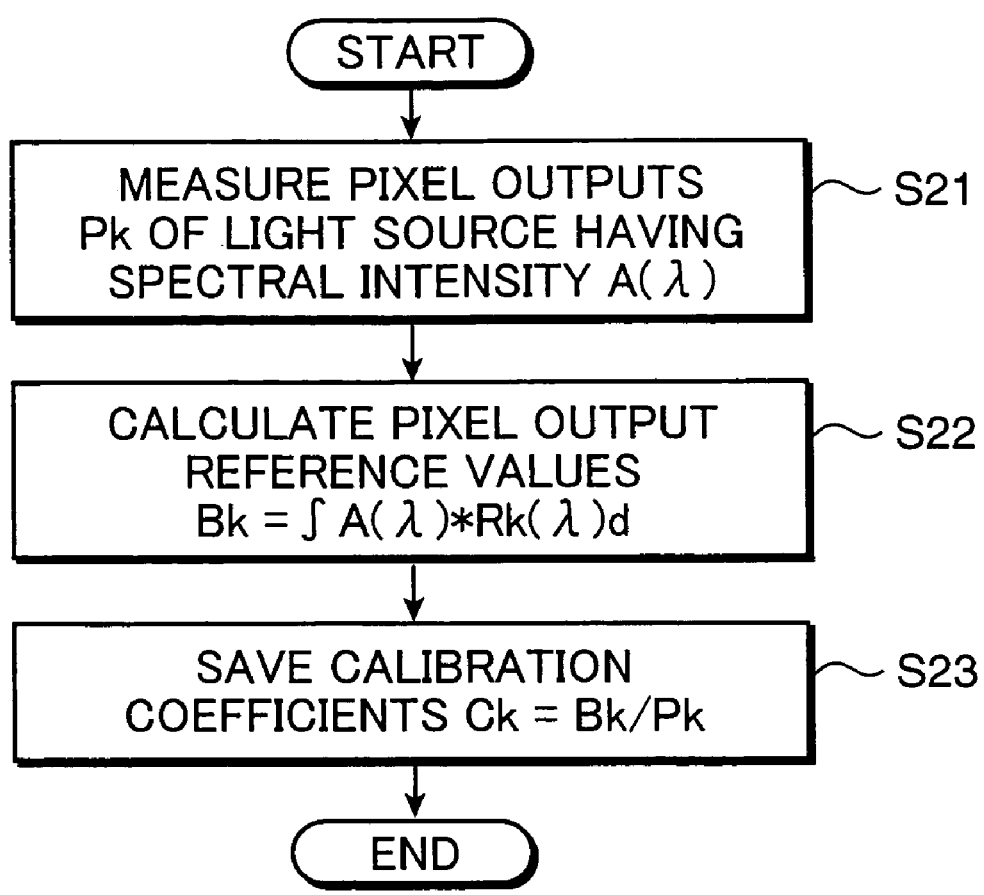
FIG. 12 is a flowchart showing operations during a sensitivity calibration.

FIG. 12 is a flowchart showing a flow of the sensitivity calibration. The weighting coefficients $Gx_k$, $Gy_k$, $Gz_k$ are set for the relative spectral responsivities $R_k(\lambda)$ whose peak sensitivity is standardized. However, the sensitivities of the respective pixels of the sensor array 43 are not uniform and the gains of the variable gain amplifier 52 and the like provided in the signal processing circuit 5 are not uniform for the respective light receiving channels. Thus, the sensitivity calibration is necessary. Here, the calibration coefficients $C_k$ used to calibrate the sensitivities and gains that are not uniform are calculated.

Upon such a sensitivity calibration, since a single wave output of a reference monochrometer as used in the spectral responsivity calibration in Step S1 cannot be generally said to possess an equal energy having a sufficient precision, a white light source for calibration having a known spectral intensity A(λ) is used for the sensitivity calibration. A white light is caused to be incident on the incidence slit 40 of the polychrometer 4 from such a light source for calibration, and the respective pixel outputs $P_k$ in the sensor array 43 at this time are measured (Step S21).

On the other hand, pixel output reference values $B_k$ assumed from the saved spectral responsivities $R_k(\lambda)$ of the respective pixels and the known spectral intensity A(λ) of the white light source for calibration are calculated by the following equation (1) (Step S22).

$$B_k = \int A(\lambda) \cdot R_k(\lambda) d\lambda \qquad (1)$$

Then, the calibration coefficients $C_k$ to be multiplied with the outputs $P_k$ of the respective pixels are calculated for the respective wavelengths by the following equation (2) so that the pixel output reference values $B_k$ and the calibrated outputs $C_k \cdot P_k$ of the respective pixels when the measurements are actually made using the white light source for calibration coincide (Step S23).

$$C_k = B_k / P_k \qquad (2)$$

The calibration coefficients $C_k$ thus calculated are saved in the memory section 63 and used as data correction factors upon actually measuring the color values.

<Step S3: Weighting Coefficient Setting>

The weighting coefficients $Gx_k$, $Gy_k$, $Gz_k$ are set after the spectral responsivity calibration and the sensitivity calibration in Step S1 and S2 at the time of production. The weighting coefficients $Gx_k$, $Gy_k$, $Gz_k$ are obtained as coefficients, for example, for approximating the composite spectral responsivities obtained by the addition of the weighted spectral responsivities $R_k(\lambda)$ of the respective light receiving channels $CH_k$ obtained in Step S1 to the spectral responsivities x(λ), y(λ), z(λ) of the color matching functions of 10° field of view specified by the CIE shown in FIG. 6.

Figure 13:
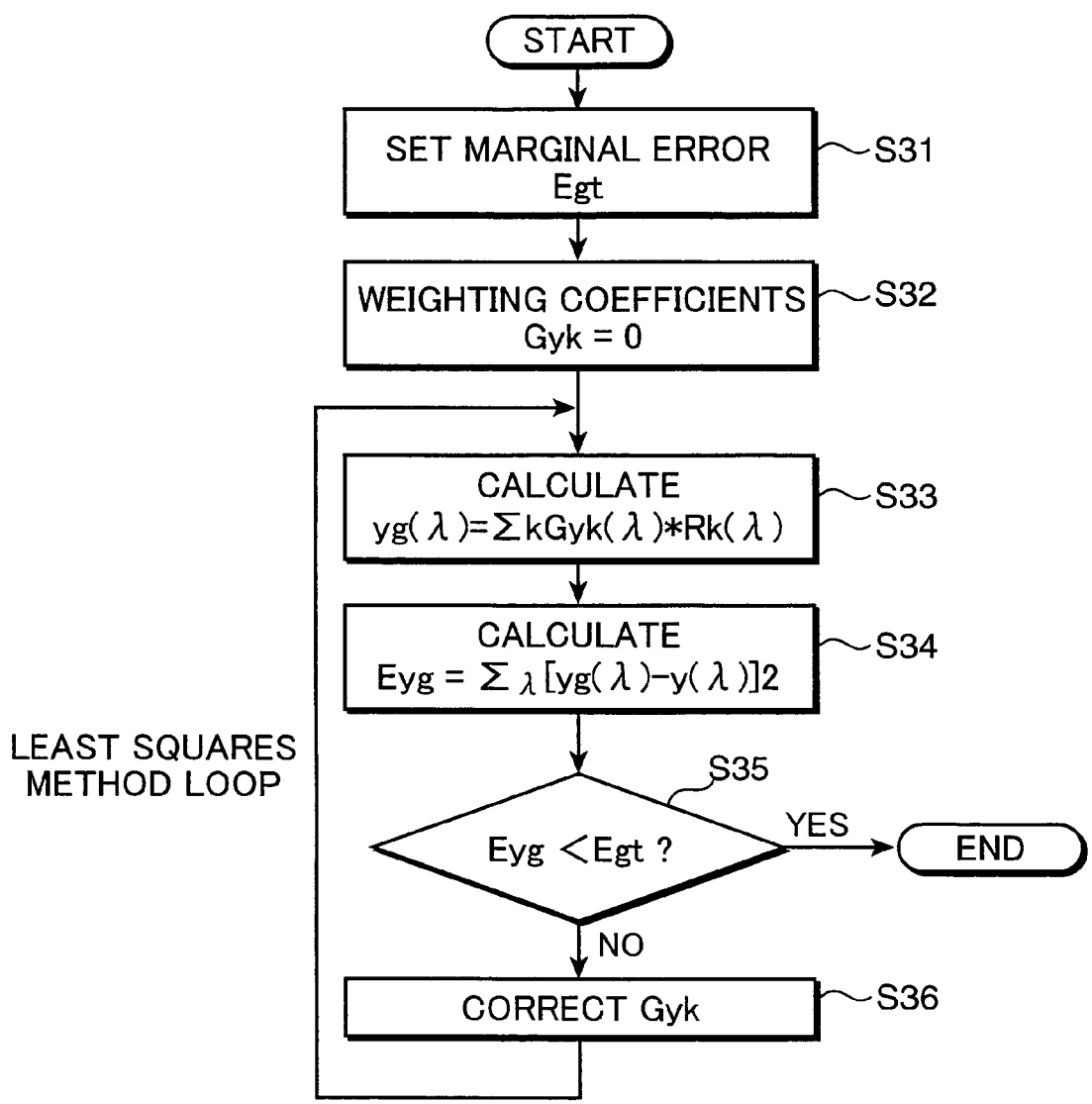
FIG. 13 is a flowchart showing operations at the time of setting weighting coefficients.
Figure 15A:
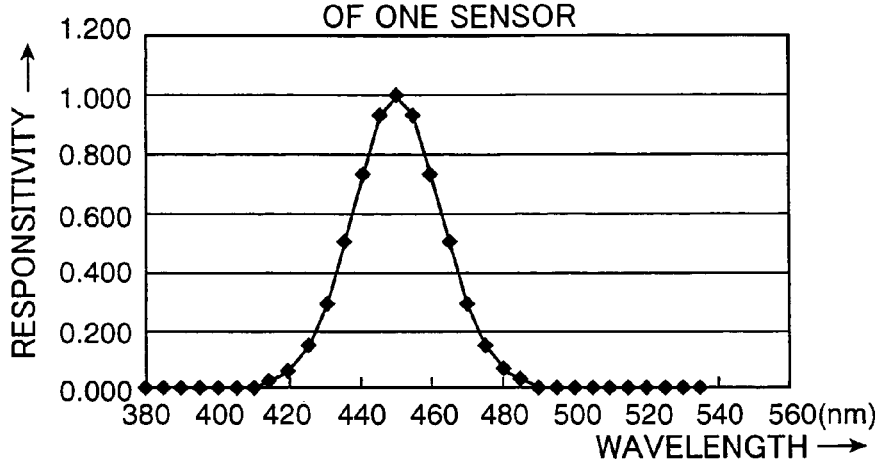
FIGS. 15A to 15C are graphs showing data according to a first example.
Figure 15B:
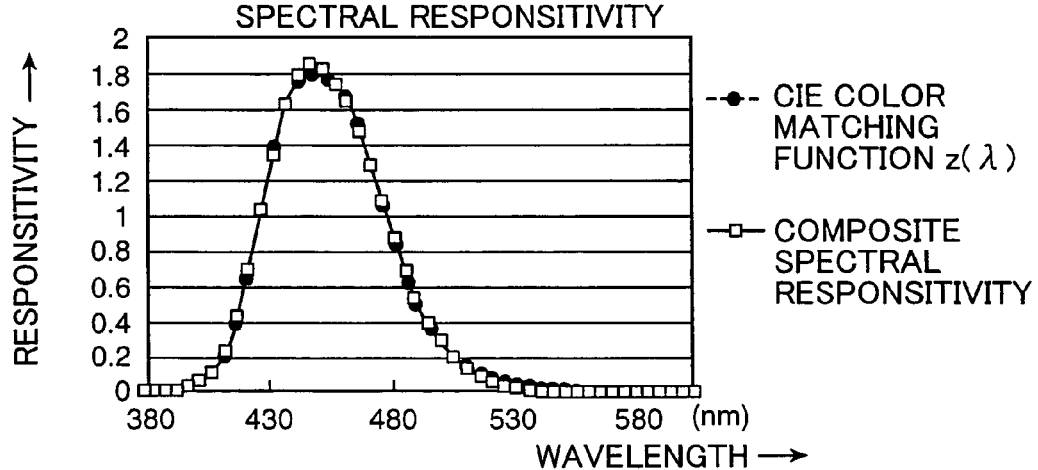
Figure 15C:
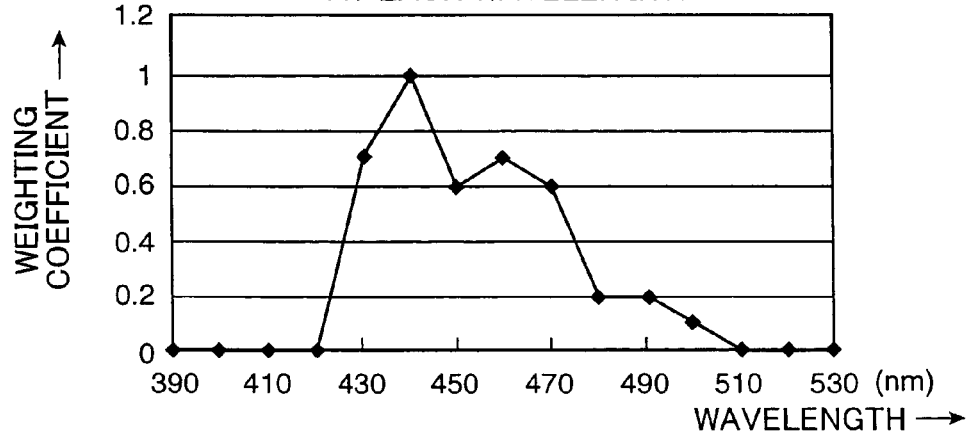
Figure 16A:
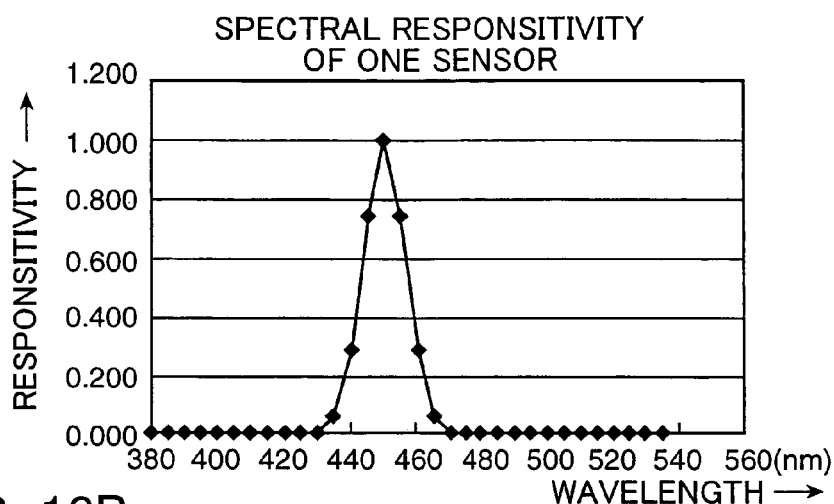
FIGS. 16A to 16C are graphs showing data according to a second example.
Figure 16B:
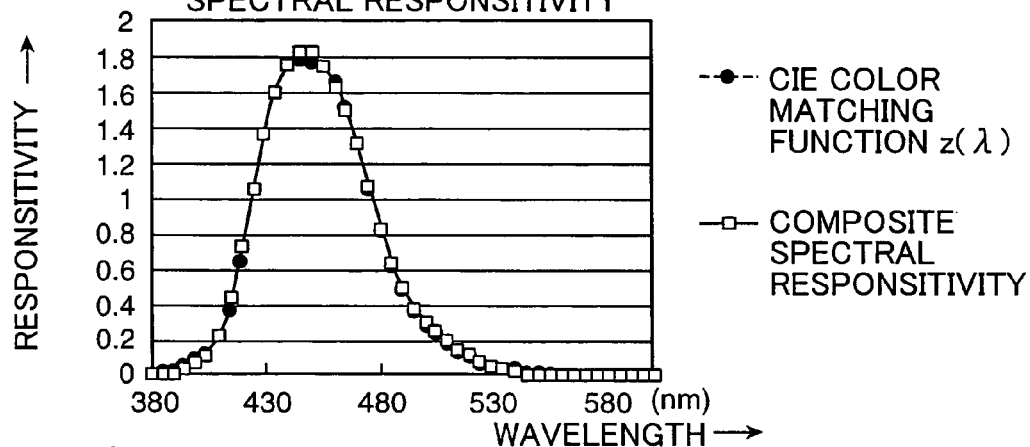
Figure 16C:
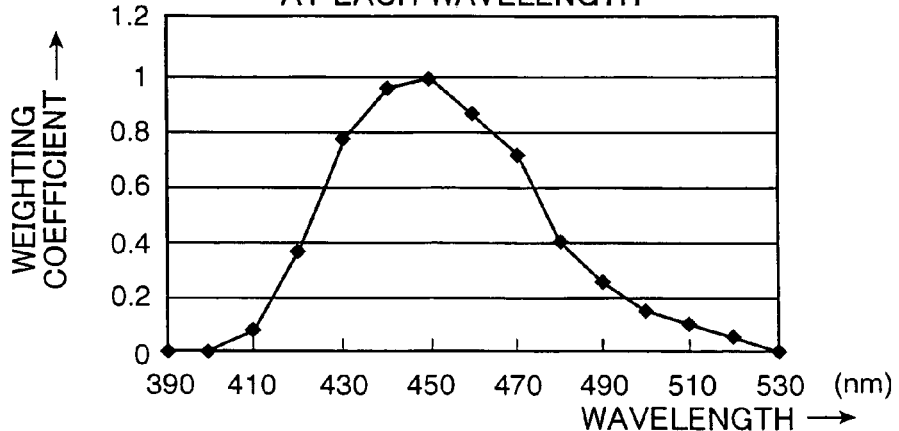
Figure 17A:
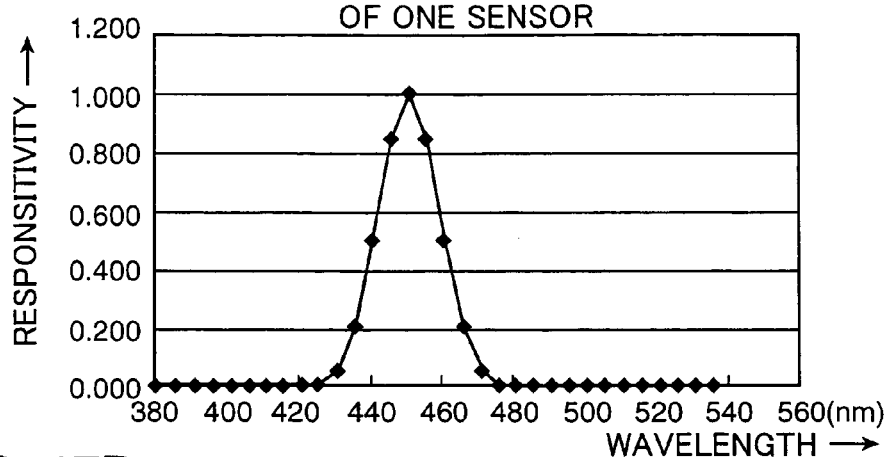
FIGS. 17A to 17C are graphs showing data according to a third example.
Figure 17B:
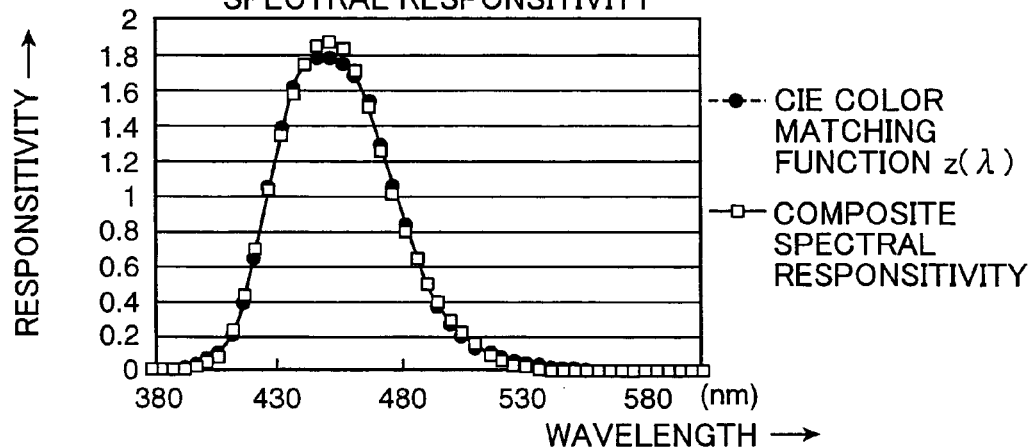
Figure 17C:
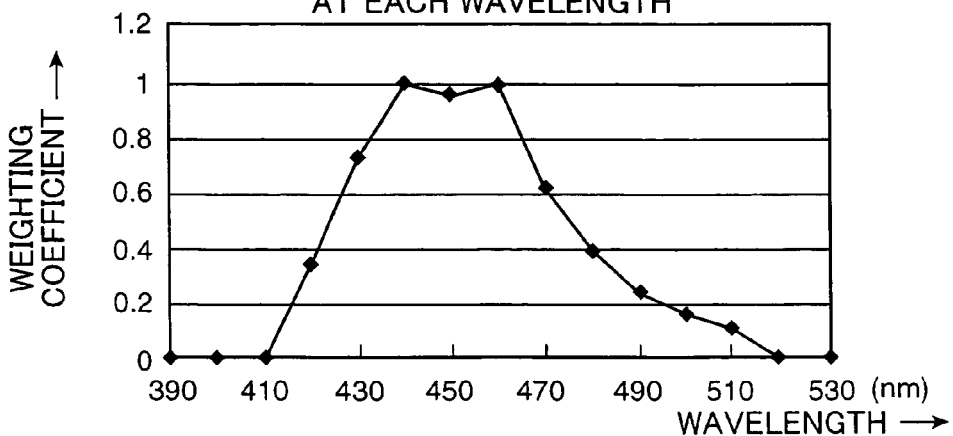
Figure 18A:
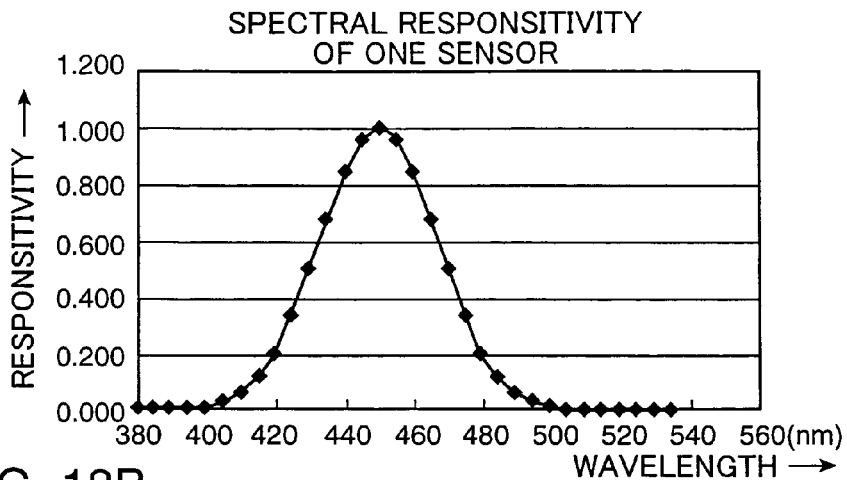
FIGS. 18A to 18C are graphs showing data according to a fourth example.
Figure 18B:
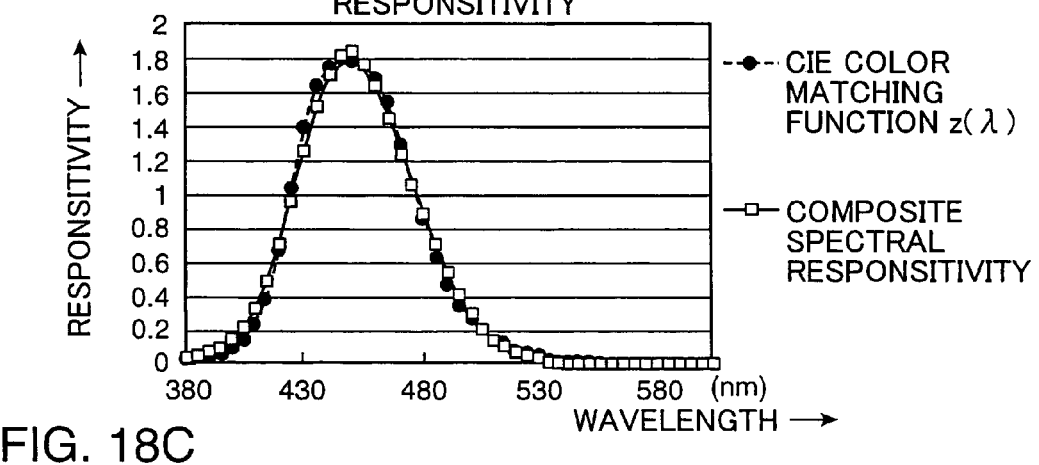
Figure 18C:
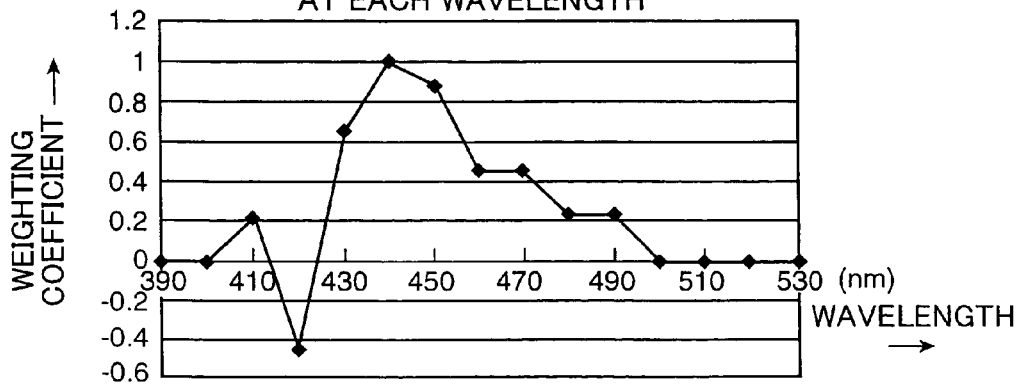

FIG. 13 is a flowchart showing an exemplary routine in the case of actually setting the weighting coefficients $Gx_k$, $Gy_k$, $Gz_k$ (The flowchart of FIG. 13 shows a case where y-sensitivity is set). Upon such a setting, a specified marginal error Egt is first set (Step S31). This marginal error Egt is a value suitably set to ensure a specified approximation precision and also a target value to suppress an approximation error within a specified range.

At the beginning of the calculation of the weighting coefficients, a calculation routine (least squares method loop) is entered after $Gx_k$, $Gy_k$, $Gz_k$ are respectively set at 0 (Step S32). The weighting coefficients $Gx_k$, $Gy_k$, $Gz_k$ are calculated by the least squares method so that the composite spectral responsivities xg(λ), yg(λ), zg(λ) given by the following equations (3-1), (3-2), (3-3) and related to the spectral responsivities $R_k(\lambda)$ of the respective pixels obtained in Step S1 to the spectral responsitivities $x(\lambda)$, $y(\lambda)$, $z(\lambda)$ of the color matching functions shown in FIG. 6.

$$xg(\lambda)=\Sigma_k Gx_k \cdot R_k(\lambda) \tag{3-1}$$

$$yg(\lambda)=\Sigma_k Gy_k \cdot R_k(\lambda) \tag{3-2}$$

$$zg(\lambda)=\Sigma_k Gz_k \cdot R_k(\lambda) \tag{3-3}$$

Specifically, the weighting coefficients $Gx_k$, $Gy_k$, $Gz_k$ are suitably corrected and the composite spectral responsitivities $xg(\lambda)$, $yg(\lambda)$, $zg(\lambda)$ at this time are set by the equations (3-1), (3-2), (3-3) (Step S33). Sums Exg, Eyg, Ezg of squares of differences between the composite spectral responsitivities $xg(\lambda)$, $yg(\lambda)$, $zg(\lambda)$ and the target spectral responsitivities $x(\lambda)$, $y(\lambda)$, $z(\lambda)$ of the color matching functions at the respective wavelengths are calculated as evaluation coefficients by the following equations (4-1), (4-2), (4-3) (Step S34).

$$Exg=\Sigma_\lambda [xg(\lambda)-x(\lambda)]^2 \tag{4-1}$$

$$Eyg=\Sigma_\lambda [yg(\lambda)-y(\lambda)]^2 \tag{4-2}$$

$$Ezg=\Sigma_\lambda [zg(\lambda)-z(\lambda)]^2 \tag{4-3}$$

Subsequently, the sums of squares Exg, Eyg, Ezg calculated in Step S34 and the marginal error Egt set in Step S31 are compared (Step S35). If the values of the sums of squares Exg, Eyg, Ezg exceed the marginal error Egt (NO in Step S35), the weighting coefficients $Gx_k1$, $Gy_k1$, $Gz_k1$, used in the above calculation are further corrected to set new weighting coefficients $Gx_k2$, $Gy_k2$, $Gz_k2$ (Step S36) and Step S33 follows to repeat the least squares method loop.

Specifically, using the sums of squares Exg, Eyg, Ezg given by the equations (4-1), (4-2), (4-3) as the evaluation coefficients, the weighting coefficients $Gx_k$, $Gy_k$, $Gz_k$ are so calculated by the least squares method that the evaluation coefficients Exg, Eyg, Ezg fall below the marginal error Egt as the threshold value (are minimized). If such weighting coefficients $Gx_k$, $Gy_k$, $Gz_k$ are calculated (YES in Step S35), they are saved in the weighting coefficient storage 631 of the memory section 63. The above operation steps are carried out at the time of producing the color luminance meter 1 (at the time of initial setting). It should be noted that different marginal errors Egt may be set for the targeted color matching functions $x(\lambda)$, $y(\lambda)$, $z(\lambda)$.

<Step S4: Flow During the Measurement>

Next, operations carried out in the case of actually measuring the color luminance values (spectral intensities) using the color luminance meter 1 according to this embodiment are described. FIG. 14 is a flowchart showing the operations carried out during the measurement. Upon the measurement, the color luminance meter 1 is arranged to face a light source for emitting a measurement light. When an instruction "Measurement Start" is given by means of the operable section 102 or the like, the shutter movement controller 611 (see FIG. 5) of the operation control unit 6 brings the shutter 3 to an "open" state to cause the measurement light to be incident through the incidence slit 40 of the polychrometer 4. At this time, outputs sensed at the respective light receiving channels $CH_k$ ($k=1$ to n) of the sensor array 43 are inputted as the respective pixel outputs $Q_k$ in response to the measurement light to the spectral intensity calculating section 621 of the calculator 62 from the signal processing circuit 5 (Step S41). If the measurement light is a light lying within a specified narrow wavelength band, particularly, a monochromatic light such as a light emitted from an LED, a more precise measurement can be conducted using the color luminance meter 1 according to this embodiment than the conventional apparatus.

In the spectral intensity calculating section 621, the respective pixel outputs $Q_k$ are obtained by the flow in Step S2 and corrected to calibrated pixel output data $I_k$ by the following equation (5) using the calibration coefficients $C_k$ saved in the memory section 63 (Step S42).

$$I_k=C_k \cdot Q_k \tag{5}$$

Further, data interpolation is applied using the light receiving channels $CH_k$ ($k=1$ to n) or a correspondence table of pixels $PD_k$ and the barycentric wavelengths $W_{ck}$ to convert the calibrated pixel output data $I_k$ into spectral intensity $I(\lambda)$ (Step S43).

Subsequently, the composite intensity calculating section 622 calculates the tristimulus values using the calibrated pixel output data $I_k$ calculated in the spectral intensity calculating section 621 and the weighting coefficients $Gx_k$, $Gy_k$, $Gz_k$ saved in the weighting coefficient storage 631 beforehand (Step S44). Specifically, the composite intensity calculating section 622 calculates data X', Y', Z' approximate to the tristimulus values X, Y, Z given by the CIE color matching functions x, y, z in accordance with the following equations (6-1), (6-2), (6-3) for adding products of the weighting coefficients $Gx_k$, $Gy_k$, $Gz_k$ and the calibrated pixel output data $I_k$ calculated by the equation (5) (Step 542), and outputs the calculated data.

$$X'=\Sigma_k Gx_k \cdot I_k \tag{6-1}$$

$$Y'=\Sigma_k Gy_k \cdot I_k \tag{6-2}$$

$$Z'=\Sigma_k Gz_k \cdot I_k \tag{6-3}$$

The characteristics of the measurement light, i.e., the color luminance values of the measurement light are obtained based on the composite intensities X', Y', Z'.

EXAMPLES

Several specific examples according to the embodiment and comparative examples to be compared with the specific examples are shown concerning the half power band width A and the center wavelength interval B of the light receiving sensors of the above light receiving sensor array 43. In the examples (comparative examples), the approximation precision of the composite spectral responsitivities to the CIE color matching function $z(\lambda)$ and S/N ratios based on the weighting coefficients for the respective wavelengths were evaluated when the center wavelength interval (wavelength pitch) of the light receiving sensors was set at 10 nm and the half power band width A was set at 10 nm, 15 nm, 20 nm, 30 nm, 40 nm and 50 nm.

Figure 20A:
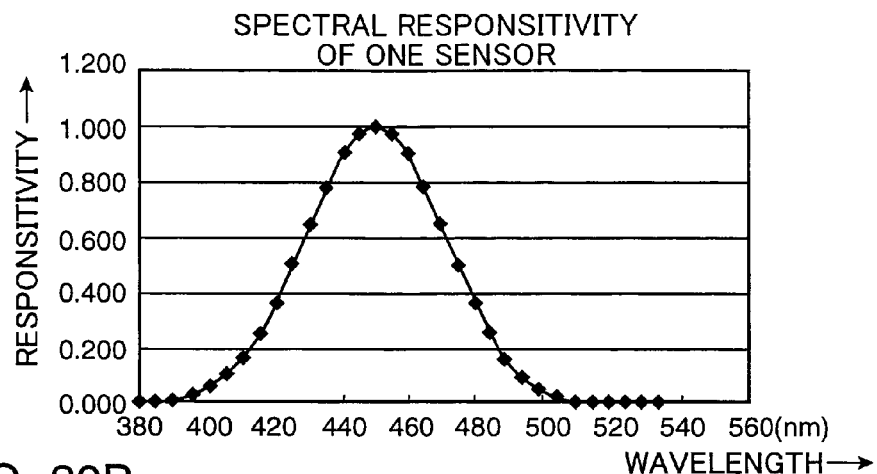
FIGS. 20A to 20C are graphs showing data according to a second comparative example.
Figure 20B:
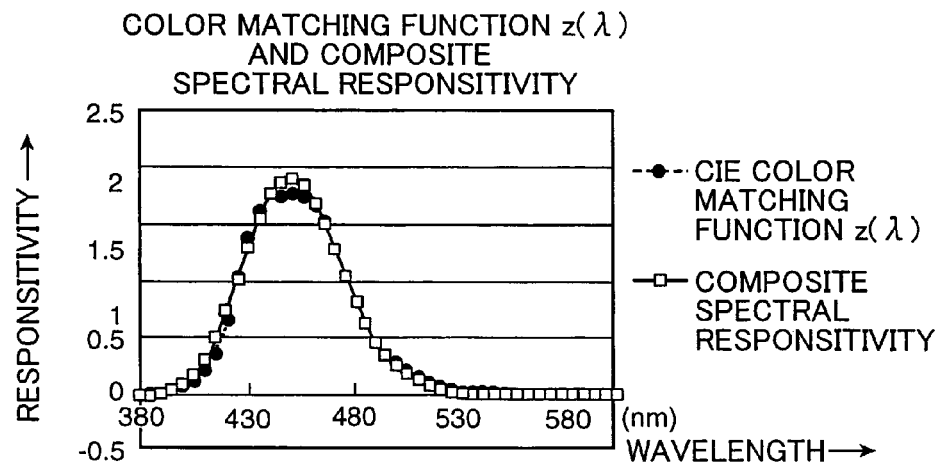
Figure 20C:
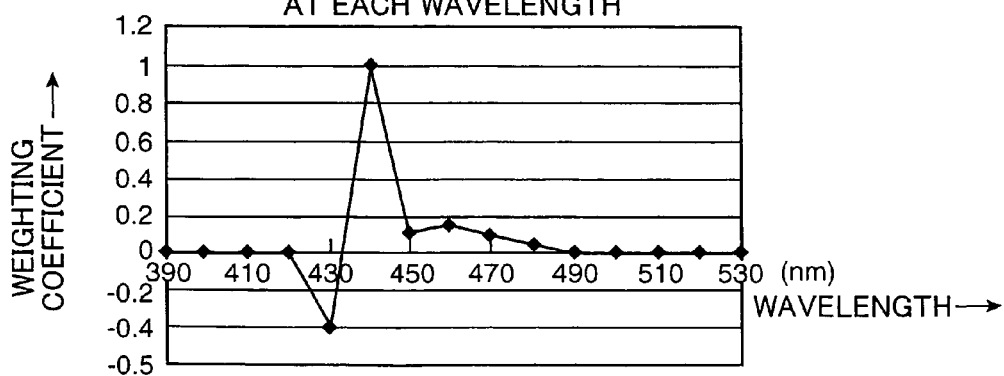

FIGS. 15 to 18 are graphs showing data according to the examples of the embodiment, whereas FIGS. 19 and 20 are graphs showing data according to the comparative examples. FIGS. 15A to 20A are graphs showing a spectral responsitivity of one light receiving sensor. FIGS. 15B to 20B are graphs showing the CIE color matching function $z(\lambda)$ and a composite spectral responsitivity obtained by compositing the outputs of the respective light receiving sensors having the spectral responsitivity shown in FIGS. 15A to 20A (wavelength pitch was 10 nm in each case) using specified weighting coefficients in a superimposing manner. In FIGS. 15B to 20B, the higher the approximation precision (fitting property), the better the composite spectral responsitivity coincides with a locus of the color matching function z(λ), i.e., the more precisely the light measurement can be conducted. FIGS. 15C to 20C show weighting coefficients given for the respective wavelength pitches of 10 nm. FIGS. 15C to 20C show that the larger the absolute values of negative values of the weighting coefficients, the more disadvantageous the S/N ratio.

Since the color matching function z(λ) whose spectral responsivity peaks in the neighborhood of 460 nm as shown in FIG. 6 is targeted, only a wavelength region of about 380 to about 580 nm are shown in the respective graphs. Here, the color matching function z(λ) is selected as a target because it has a higher peak value of the spectral responsivity as compared to the other color matching functions x(λ), y(λ), has a sharp characteristic and, therefore, is a color matching function to which it is most difficult to approximate the composite spectral responsivity in the spectral fitting method.

The approximation precision to the CIE color matching function z(λ) and the evaluation values of the S/N ratios based on the weighting coefficients for the respective wavelengths are shown in TABLE-1 below for the examples and the comparative examples shown in FIGS. 15 to 20.

the like, it is difficult to accomplish the approximation having a good fitting property due to the pointedness of the spectral responsitivities.

Even in the case that the composite spectral responsivity locally undulates as above, errors can be evened if the measurement light is a light having a broad wavelength spectrum such as the one emitted from a white light source. Thus, there are relatively few problems. However, if the measurement light is a monochromatic light having a line spectrum, errors are large at wavelengths where the spectral responsivity is largely deviated from the color matching function z(λ) due to the "undulation". This causes an inconvenience of being unable to measure the color luminance values with high precision. Accordingly, with the ratio of the half power band width A to the center wavelength interval B set at 1, the comparative example 1 may not be proper for the light measurement, particularly the measurement of the monochromatic light.

Although the approximation precision is relatively good in the comparative example 2 where the ratio of the half power band width A to the center wavelength interval B is set at 5, some of the weighting coefficients take negative

TABLE 1

|  | HALF POWER BAND WIDTH A (nm) | CENTER WAVELENGTH INTERVAL B (nm) | A/B | APPROXIMATION PRECISION TO z(λ) | S/N EVALUATION |
|---|---|---|---|---|---|
| EXAMPLE 1 | 30 | 10 | 3 | ○ | ○ |
| EXAMPLE 2 | 15 |  | 1.5 | ○ | ○ |
| EXAMPLE 3 | 20 |  | 2 | ○ | ○ |
| EXAMPLE 4 | 40 |  | 4 | ○ | ○ |
| COMP. EXAMPLE 1 | 10 |  | 1 | X | ○ |
| COMP. EXAMPLE 2 | 50 |  | 5 | ○ | X |

In examples in which the center wavelength interval was 10 nm and a ratio of the half power band width A to the center wavelength interval B lied within a range of 1.5 to 4.0, satisfactory results could be obtained for the approximation precision to the color matching function z(λ) and the S/N ratios. Specifically, as is clear from FIGS. 15B to 18B, the color matching function z(λ) and the composite spectral responsivity coincide with each other well, from which it can be understood that proper approximation (fitting) is accomplished in the examples 1 to 4. Further, the weighting coefficients take positive values and do not adversely affect the S/N ratios in any of the examples 1 to 3. Although some of the weighting coefficients take negative values in the example 4, a rate of the weighting coefficients taking negative values to all the weight coefficients is about 12%, which does not largely deteriorate the S/N ratios.

On the other hand, in the comparative example in which the ratio of the half power band width A to the center wavelength interval B is set at 1, the approximation precision is poor in the neighborhood of the peak value of the color matching function z(λ), wherein "undulation" is found in the composite spectral responsivity as is also clear from FIG. 19B. This is because of the following reason. Since the half power band width A of the spectral responsivities of the individual light receiving sensors is narrower as compared to the wavelength pitch (10 nm), the pointedness of the spectral responsivities stands out as shown in FIG. 19A. Thus, even if an attempt is made to approximate the composite spectral responsivity to a curve of the targeted color matching function z(λ) by the least squares method or values as is clear from FIG. 20C. Further, different from the example 4, a rate of the weighting coefficients taking negative values to all the weighting coefficients increases to about 38%, whereby the deterioration of the S/N ratio is conspicuous.

The above S/N ratio is additionally described. First, when the ratio of the half power band width A to the center wavelength interval B increases, curves of the spectral responsivities of the respective light receiving sensors become wider than the curve of the color matching function z(λ), with the result that it is necessary to narrow the curve of the composite spectral responsivity by letting the weighting coefficients of some of the light receiving sensors take negative values in order to approximate the wider parts of the curves to the color matching function z(λ). Here, the outputs of the light receiving sensors include random noise components in addition to signal components. The noise components are added in every composition regardless of whether the composition is to add or subtract the outputs of the respective light receiving sensors. On the other hand, the signal components become smaller in the case of the subtractive composition, wherefore the noise components become relatively larger as compared to the signal components. Thus, if the outputs of the light receiving sensors to be composited include many of those multiplied by the weighting coefficients taking negative values, a ratio of the noise components accordingly increases, leading to the deterioration of the S/N ratio. For such a reason, the comparative example in which the ratio of the half power band width A to the center wavelength interval B is set at 5 is not proper in terms of the S/N ratio.

As described above, a light measuring apparatus comprises: a spectral device for dispersing measurement light at each of specified wavelengths; a predetermined number of photoelectrical converters for receiving the dispersed measurement light and outputting light reception signals corresponding to the predetermined number of wavelengths; a storage device for storing the predetermined number of weight coefficients set beforehand to obtain a specified spectral responsivity in accordance with the light reception signals outputted from the respective photoelectrical converters; and a calculator for calculating characteristics of the measurement light based on the specified spectral responsivity using the respective light reception signals and the respective weight coefficients.

The spectral responsivities and wavelength pitch of the respective photoelectrical converters are so determined as to satisfy the following conditions (1), (2):

$$B \geq 5 \text{ nm}, \quad (1)$$

$$A/B = 1.5 \text{ to } 4.0. \quad (2)$$

wherein A denotes a half power band width of the spectral responsitivities of the respective photoelectrical converters and B denotes a center wavelength interval of the spectral responsitivities of the respective photoelectrical converters.

With this construction, the half power band width A of the spectral responsivities of the respective photoelectrical converters and the center wavelength interval B of the spectral responsivities of the respective photoelectrical converters are optimized, and approximation precision can be improved in the spectral fitting method of measuring light by calculating a composite spectral responsivity approximate to a specified spectral responsivity. Thus, a highly precise light measurement can be conducted based on the composite spectral responsivity, enabling a luminance measurement and a chromaticity measurement with high precision.

If the center wavelength interval B is shorter than 5 nm, the wavelength pitch is too short, making it less necessary to improve the approximation precision of the composite spectral responsivity to the specified spectral responsivity by this technology (construction analogous to the aforementioned "spectral luminance meter"). If the ratio of the half power band width A to the center wavelength interval B falls below 1.5, the half power band width A of the spectral responsivities of the respective photoelectrical converters becomes too short as compared to the wavelength pitch, with the result that the pointedness of the spectral responsivity becomes conspicuous. Thus, even if an attempt is made to approximate the spectral responsivity to a target curve of, e.g., a color matching function by the least squares method or the like, there is a tendency to make approximation having a good fitting property difficult due to the pointedness of the spectral responsivity. Further, if the ratio of the half power band width A to the center wavelength interval B exceeds 4.0, the half power band width A of the spectral responsivities becomes too long as compared to the wavelength pitch, with the result that a larger percentage of the weighting coefficients to be multiplied with the spectral responsivities of the respective photoelectrical converters take negative values. This increases an extent of negatively weighted signal components, thereby presenting a tendency to deteriorate a S/N ratio. Therefore, there can be provided a light measurement apparatus capable of highly precisely measuring lights of all spectra from broad lights to monochromatic lights.

The measurement light may be preferably introduced to the spectral device via a circular specified incidence slit. With this construction, the shape of the spectral responsitivity can be approximated to a Gaussian curve. Therefore, more precise fitting can be carried out in the spectral fitting method.

The center wavelength interval B may preferably lie in a range of 5 nm or more to 35 nm or less. With this construction, the wavelength pitch of the photoelectrical converters is restricted to at longest 35 nm, with the result that the light reception signals can be obtained at relatively narrower wavelength pitches although the wavelength pitch is not as narrow as in conventional spectral luminance meters. Thus, the number of data used for the approximation is increased, leading to a higher approximation precision. Therefore, there can be provided a light measuring apparatus capable of conducting luminance measurement, chromaticity measurements or like light measurements with higher precision.

The center wavelength interval B may preferably lie in a range of 7 nm or more to 13 nm or less. The ratio of the half power band width A to the center wavelength interval B may preferably lie in a range of 2.5 or more to 3.5 or less. With this construction, the aforementioned pointedness of the spectral responsivity and the S/N ratio can be optimized, thereby further improving the approximation precision and bettering the S/N ratio. Therefore, there can be provided a light measuring apparatus capable of conducting luminance measurement, chromaticity measurements or like light measurements with even higher precision.

It may be preferable that any of the predetermined number of photoelectrical converters receives light in a visible wavelength region, the weight coefficients are for generating a composite spectral responsivity approximated to a spectral responsivity of a specified color matching function, the calculator calculates the characteristics of the measurement light based on the composite spectral responsivity, and the light measuring apparatus is used as a spectral calorimeter.

With this construction, the approximation precision to the color matching function can be improved, with the result that there can be provided a spectral color meter adopting the spectral fitting method and capable of conducting color measurements such as luminance measurements and chromaticity measurements with high precision. Therefore, there can be provided a spectral color meter adopting the spectral fitting method, which meter is capable of conducting luminance measurement, chromaticity measurements or like light measurements with high precision.

Further, a method for measuring a monochromatic light using the above-mentioned light measuring apparatus, comprises: calculating a composite intensity by adding products of the light reception signals respectively outputted from the predetermined number of photoelectrical converters and specified weight coefficients for the approximation to a spectral responsivity of a specified color matching function; and calculating characteristics of the monochromatic light based on the composite intensity.

In the case that a measurement light is a light having a broad light emission wavelength band such as the one emitted from a white light source, errors can be substantially evened and do not particularly stand out as a whole due to a broad light emission wavelength band even if the half power band width A and the center wavelength interval B are not optimized and a spectral responsivity does not partially or locally precisely approximate to a specified spectral responsivity. However, in the case that measurement light is a monochromatic light such as one of those emitted from various displays and LEDs, there is a possibility of obtaining a measurement result including a large error due to a narrow light emission wavelength band if the monochromatic light is measured at the spectral responsivity having an insufficient approximation precision. Accordingly, the approximation precision is improved entirely as well as partially by optimizing the half power band width A and the center wavelength interval B as described above, with the result that the monochromatic can also be measured with high precision. Therefore, lights of all spectra from broad lights to monochromatic lights can be highly precisely measured by one light measuring apparatus.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A light measuring apparatus, comprising:
    a spectral device for dispersing measurement light at each of specified wavelengths;
    a predetermined number of photoelectrical converters for receiving the dispersed measurement light and outputting light reception signals corresponding to the predetermined number of wavelengths;
    a storage device for storing the predetermined number of weight coefficients set beforehand to obtain a specified spectral responsivity in accordance with the light reception signals outputted from the respective photoelectrical converters; and
    a calculator for calculating characteristics of the measurement light based on the specified spectral responsivity using the respective light reception signals and the respective weight coefficients,
    wherein the spectral responsivities and wavelength pitch of the respective photoelectrical converters are so determined as to satisfy the following conditions (1), (2):
    (1) $B \geq 5$ nm,
    (2) $A/B = 1.5$ to $4.0$.
    wherein A denotes a half power band width of the spectral responsivities of the respective photoelectrical converters and B denotes a center wavelength interval of the spectral responsivities of the respective photoelectrical converters.

2. A light measuring apparatus according to claim 1, wherein the measurement light is introduced to the spectral device via a circular specified incidence slit.

3. A light measuring apparatus according to claim 2, wherein the center wavelength interval B is in a range of 5 nm or more to 35 nm or less.

4. A light measuring apparatus according to claim 3, wherein:
    any of the predetermined number of photoelectrical converters receives light in a visible wavelength region;
    the weight coefficients are for generating a composite spectral responsivity approximated to a spectral responsivity of a specified color matching function;
    the calculator calculates the characteristics of the measurement light based on the composite spectral responsivity; and
    the light measuring apparatus is used as a spectral colorimeter.

5. A light measuring apparatus according to claim 2, wherein the center wavelength interval B is in a range of 7 nm or more to 13 nm or less, and the ratio of the half power band width A to the center wavelength interval B is in a range of 2.5 or more to 3.5 or less.

6. A light measuring apparatus according to claim 5, wherein:
    any of the predetermined number of photoelectrical converters receives light in a visible wavelength region;
    the weight coefficients are for generating a composite spectral responsivity approximated to a spectral responsivity of a specified color matching function;
    the calculator calculates the characteristics of the measurement light based on the composite spectral responsivity; and
    the light measuring apparatus is used as a spectral colorimeter.

7. A light measuring apparatus according to claim 1, wherein the center wavelength interval B is in a range of 5 nm or more to 35 nm or less.

8. A light measuring apparatus according to claim 7, wherein:
    any of the predetermined number of photoelectrical converters receives light in a visible wavelength region;
    the weight coefficients are for generating a composite spectral responsivity approximated to a spectral responsivity of a specified color matching function;
    the calculator calculates the characteristics of the measurement light based on the composite spectral responsivity; and
    the light measuring apparatus is used as a spectral colorimeter.

9. A light measuring apparatus according to claim 1, wherein the center wavelength interval B is in a range of 7 nm or more to 13 nm or less, and the ratio of the half power band width A to the center wavelength interval B is in a range of 2.5 or more to 3.5 or less.

10. A light measuring apparatus according to claim 9, wherein:
    any of the predetermined number of photoelectrical converters receives light in a visible wavelength region;
    the weight coefficients are for generating a composite spectral responsivity approximated to a spectral responsivity of a specified color matching function;
    the calculator calculates the characteristics of the measurement light based on the composite spectral responsivity; and
    the light measuring apparatus is used as a spectral colorimeter.

11. A method for measuring a monochromatic light using a light measuring apparatus which is provided with a spectral device for dispersing measurement light at each of specified wavelengths, and a predetermined number of photoelectrical converters for receiving the dispersed measurement light and outputting light reception signals corresponding to the predetermined number of wavelengths, wherein spectral responsivities and a wavelength pitch of the respective photoelectrical converters are so determined as to satisfy the following conditions (3), (4):

$$B \geq 5 \text{ nm}, \quad (3)$$

$$A/B = 1.5 \text{ to } 4.0, \quad (4)$$

wherein A denotes a half power band width of the spectral responsivities of the respective photoelectrical converters and B denotes a center wavelength interval of the spectral responsivities of the respective photoelectrical converters,
    the method comprising:
calculating a composite intensity by adding products of the light reception signals respectively outputted from the predetermined number of photoelectrical converters and specified weight coefficients for the approximation to a spectral responsivity of a specified color matching function; and calculating characteristics of the monochromatic light based on the composite intensity.

12. A method according to claim 11, wherein the measurement light is introduced to the spectral device via a circular specified incidence slit.

13. A method according to claim 12, wherein the center wavelength interval B is in a range of 5 nm or more to 35 nm or less.

14. A method according to claim 13, wherein:
any of the predetermined number of photoelectrical converters receives light in a visible wavelength region;
the weight coefficients are for generating a composite spectral responsivity approximated to a spectral responsivity of a specified color matching function;
the calculator calculates the characteristics of the measurement light based on the composite spectral responsivity; and
the light measuring apparatus is used as a spectral colorimeter.

15. A method according to claim 12, wherein the center wavelength interval B is in a range of 7 nm or more to 13 nm or less, and the ratio of the half power band width A to the center wavelength interval B is in a range of 2.5 or more to 3.5 or less.

16. A method according to claim 15, wherein:
any of the predetermined number of photoelectrical converters receives light in a visible wavelength region;
the weight coefficients are for generating a composite spectral responsivity approximated to a spectral responsivity of a specified color matching function;
the calculator calculates the characteristics of the measurement light based on the composite spectral responsivity; and
the light measuring apparatus is used as a spectral colorimeter.

17. A method according to claim 11, wherein the center wavelength interval B is in a range of 5 nm or more to 35 nm or less.

18. A method according to claim 17, wherein:
any of the predetermined number of photoelectrical converters receives light in a visible wavelength region;
the weight coefficients are for generating a composite spectral responsivity approximated to a spectral responsivity of a specified color matching function;
the calculator calculates the characteristics of the measurement light based on the composite spectral responsivity; and
the light measuring apparatus is used as a spectral colorimeter.

19. A method according to claim 11, wherein the center wavelength interval B is in a range of 7 nm or more to 13 nm or less, and the ratio of the half power band width A to the center wavelength interval B is in a range of 2.5 or more to 3.5 or less.

20. A method according to claim 19, wherein:
any of the predetermined number of photoelectrical converters receives light in a visible wavelength region;
the weight coefficients are for generating a composite spectral responsivity approximated to a spectral responsivity of a specified color matching function;
the calculator calculates the characteristics of the measurement light based on the composite spectral responsivity; and
the light measuring apparatus is used as a spectral colorimeter.

* * * * *

UNITED STATES PATENT AND TRADEMARK OFFICE
CERTIFICATE OF CORRECTION

PATENT NO. : 7,369,239 B2 Page 1 of 1
APPLICATION NO. : 11/210380
DATED : May 6, 2008
INVENTOR(S) : Yoshiyuki Nagashima et al.

It is certified that error appears in the above-identified patent and that said Letters Patent is hereby corrected as shown below:

Column 20, in claim 6, lines 11-12, after "used as a spectral" delete "calorimeter" and substitute --colorimeter-- in its place.

Column 20, in claim 8, lines 11-12, after "used as a spectral" delete "calorimeter" and substitute --colorimeter-- in its place.

Column 22, in claim 18, lines 10-11, after "used as a spectral" delete "calorimeter" and substitute --colorimeter-- in its place.

Signed and Sealed this

Twelfth Day of August, 2008

JON W. DUDAS
*Director of the United States Patent and Trademark Office*